US009456151B2

(12) United States Patent
Sambonsugi

(10) Patent No.: US 9,456,151 B2
(45) Date of Patent: Sep. 27, 2016

(54) IMAGE PICKUP APPARATUS AND CONTROL METHOD WHERE CORRECTION DATA ARE USED AND UPDATED FOR IMAGE DATA CORRECTION

(71) Applicant: CANON KABUSHIKI KAISHA, Tokyo (JP)

(72) Inventor: Hideaki Sambonsugi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 13/758,497

(22) Filed: Feb. 4, 2013

(65) Prior Publication Data

US 2013/0208159 A1  Aug. 15, 2013

(30) Foreign Application Priority Data

Feb. 10, 2012 (JP) .................................. 2012-027368

(51) Int. Cl.
*H04N 5/335* (2011.01)
*H04N 5/357* (2011.01)
*H04N 5/361* (2011.01)

(52) U.S. Cl.
CPC ............... *H04N 5/335* (2013.01); *H04N 5/357* (2013.01); *H04N 5/361* (2013.01)

(58) Field of Classification Search
USPC .................................................. 348/248, 249
See application file for complete search history.

(56) References Cited

U.S. PATENT DOCUMENTS

| 2004/0165101 | A1* | 8/2004 | Miyanari et al. | 348/363 |
|---|---|---|---|---|
| 2004/0169896 | A1 | 9/2004 | Kondo | |
| 2006/0092283 | A1* | 5/2006 | Tanizoe et al. | 348/207.99 |
| 2006/0237721 | A1* | 10/2006 | Muramatsu | H04N 3/1562 257/59 |
| 2006/0274173 | A1* | 12/2006 | Yoshida et al. | 348/294 |
| 2007/0165120 | A1* | 7/2007 | Takane | H04N 5/2351 348/248 |
| 2010/0085451 | A1* | 4/2010 | Suwa | 348/249 |

(Continued)

FOREIGN PATENT DOCUMENTS

| CN | 101180869 A | 5/2008 |
|---|---|---|
| JP | 10-256522 A | 9/1998 |
| JP | 2005-057691 | 3/2005 |

(Continued)

OTHER PUBLICATIONS

Jun. 26, 2015 Korean Office Action, that issued in Korean Patent Application No. 10-2013-0013226.

(Continued)

*Primary Examiner* — Shahbaz Nazrul
(74) *Attorney, Agent, or Firm* — Cowan, Liebowitz & Latman, P.C.

(57) ABSTRACT

An image pickup element having a pixel array of a plurality of pixels, with first and second areas: generates a correction data based on the image signal read from the first area; stores the generated correction data in addresses of a memory corresponding to horizontal positions of the read pixels in the first area; reads the correction data from the addresses of the memory corresponding to a horizontal range set in the second area, and corrects the image signal read from the range set in the second area, using the read correction data; and updates the correction data stored in a predetermined range of addresses in the memory, based on the image signal read from a horizontal range in the first area corresponding to the predetermined range of addresses, and irrespective of the range set in the second area.

14 Claims, 29 Drawing Sheets

(56) References Cited

U.S. PATENT DOCUMENTS

2012/0105688 A1* 5/2012 Kita .............................. 348/242
2014/0293098 A1* 10/2014 Nishizawa .................... 348/243

FOREIGN PATENT DOCUMENTS

| JP | 2005057691 A | 3/2005 |
|---|---|---|
| JP | 2006-310932 A | 11/2006 |
| JP | 2007-243558 A | 9/2007 |
| JP | 2007-336343 A | 12/2007 |
| JP | 2008-252605 A | 10/2008 |
| JP | 2010-074648 A | 4/2010 |

OTHER PUBLICATIONS

Dec. 22, 2015 Japanese Office Action, that issued in Japanese Patent Application No. 2012027368.

Sep. 6, 2015 Chinese Office Action, that issued in Chinese Patent Application No. 201310052997.0.

* cited by examiner

IMAGE PICKUP APPARATUS AND CONTROL METHOD WHERE CORRECTION DATA ARE USED AND UPDATED FOR IMAGE DATA CORRECTION

BACKGROUND OF THE INVENTION

1. Field of the Invention

The present invention relates to an image pickup apparatus, such as a digital camera, and in particular to an image pickup apparatus that corrects a picked-up image data with on a correction data generated from a data that is obtained from an image pickup element on photographing to generate the correction data, a control method and a program thereof.

2. Description of the Related Art

Typically, in an image pickup apparatuses, such as a digital camera or a digital video camera, a correction data for correcting an output of an image pickup element is held in advance in the camera, and an image data is corrected using the correction data to obtain an image of good quality. However, if the image pickup element is continuously driven for a long time, the temperature of the image pickup element rises and the characteristics are changed. When the characteristics of the image pickup element are changed, good correction may not be performed based on the correction data held in advance.

To solve the problem as described above, for instance, there is provided an image pickup apparatus having a configuration that regenerates a correction data when a condition on photographing, such as temperature, is changed (see Japanese Patent Application Laid-Open No. 2005-57691).

However, the image pickup apparatus described in Japanese Patent Application Laid-Open No. 2005-57691 has the following problem.

In the case of continuously obtaining an image data, e.g. a moving image, to regenerate the correction data on change of the image pickup condition, it is necessary to interrupt image data obtaining. Thus, the problem is in that the obtained image has a break therein when the correction data is generated again.

SUMMARY OF THE INVENTION

Accordingly, an aspect of the invention is to provide an image pickup apparatus that can correct a picked-up image data without interrupting image data obtaining even when the image pickup condition is changed in moving image photographing, and a control method thereof.

To achieve the above object, an image pickup apparatus of the present invention includes: an image pickup element that includes a pixel array of a plurality of pixels arranged in a two-dimensional matrix form to generate an image signal, the pixel array including a first area and a second area; a generation unit that generates a correction data based on the image signal read out from the pixels in the first area; a storing unit that includes a memory, and stores the correction data generated by the generation unit in addresses of the memory corresponding to horizontal positions of the read-out pixels of the first area; a correction unit that reads out the correction data from the addresses of the memory corresponding to a horizontal range set in the second area, and corrects the image signal read out from the pixels in the range set in the second area, using the read-out correction data; and an update unit that updates the correction data stored in a predetermined range of addresses in the memory, based on the image signal read out from the pixels in a horizontal range of the first area corresponding to the predetermined range of addresses, the updated range being irrespective of the range set in the second area.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 18A, 18B, 180, 18D, 18E, 18F, 18G, 18H and 18I are diagrams schematically illustrating memory access in storing a correction data by an image correction unit according to the second embodiment of the present invention.

FIGS. 22A, 22B, 22C, 22D, 22E and 22F are diagrams schematically illustrating memory access in reading the correction data by the image correction unit according to the second embodiment of the present invention.

DESCRIPTION OF THE EMBODIMENTS

Exemplary embodiments of the present invention will now be described in detail in accordance with the accompanying drawings.

First Embodiment

Figure 1:
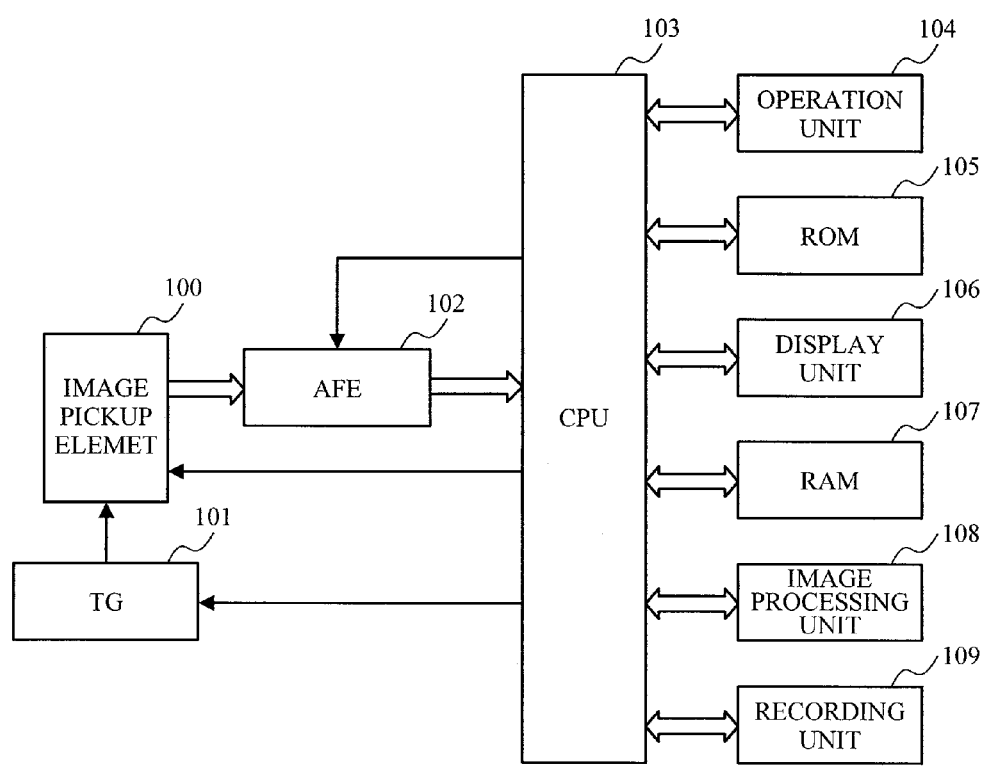
FIG. 1 is a block diagram illustrating an image pickup apparatus according to a first embodiment of the present invention.

FIG. 1 is a block diagram illustrating a configuration of an image pickup apparatus according to a first embodiment of the present invention.

The illustrated image pickup apparatus has a function of photographing a moving image, and includes an image pickup element 100 that picks up an image of an object to obtain an image signal. That is, the image pickup element 100 converts an optical image of the object into an electric signal (analog signal, i.e., image signal) through photoelectric conversion.

In this diagram, the gain of an analog signal output from the image pickup element 100 is adjusted by an analog front end (AFE) 102, and the signal is converted into a digital signal (image data) according to a predetermined quantization bit. The drive timing of the image pickup element 100 and the AFE 102 is controlled by a timing generator (TG) 101. The TG 101 itself is controlled by a CPU 103 executing a control program.

A RAM 107 is a memory (image memory) for storing an image data output from the AFE 102 and an image data processed by an after-mentioned image processing unit 108. The RAM 107 is used also as a working memory by an after-mentioned CPU 103. Here, the RAM 107 is used as the image memory and the working memory. However, other memory may be used only if the memory has an access speed level that does not cause a problem.

A ROM 105 stores a program to be executed by the CPU 103. In this embodiment, a flash ROM is used as the ROM 105. However, other memory may be used only if the memory has an access speed level that does not cause a problem.

The CPU 103 loads the program stored in the ROM 105 and executes the program, thereby integrally controlling the image pickup apparatus. The image processing unit 108 performs processes, such as correction and compression of an image data obtained through photographing, and includes an after-mentioned image correction unit 300.

A recording unit 109 includes, for instance, a recording medium, such as a nonvolatile memory or hard disk, and records image data, such as a still image data and moving image data and information related thereto in the recording medium. In the illustrated diagram, the recording unit 109 is included in the image pickup apparatus. Instead, this unit may be an external recording device including a recording medium, such as a nonvolatile memory or a hard disk, detachably attached via a connector.

An operation unit 104 is used for inputting an instruction by a user and setting information when setting of a photographing command, and an image pickup condition and the like is performed on the CPU 103. A display unit 106 displays a still image and a moving image obtained through photographing and a menu screen under control of the CPU 103.

Figure 2:
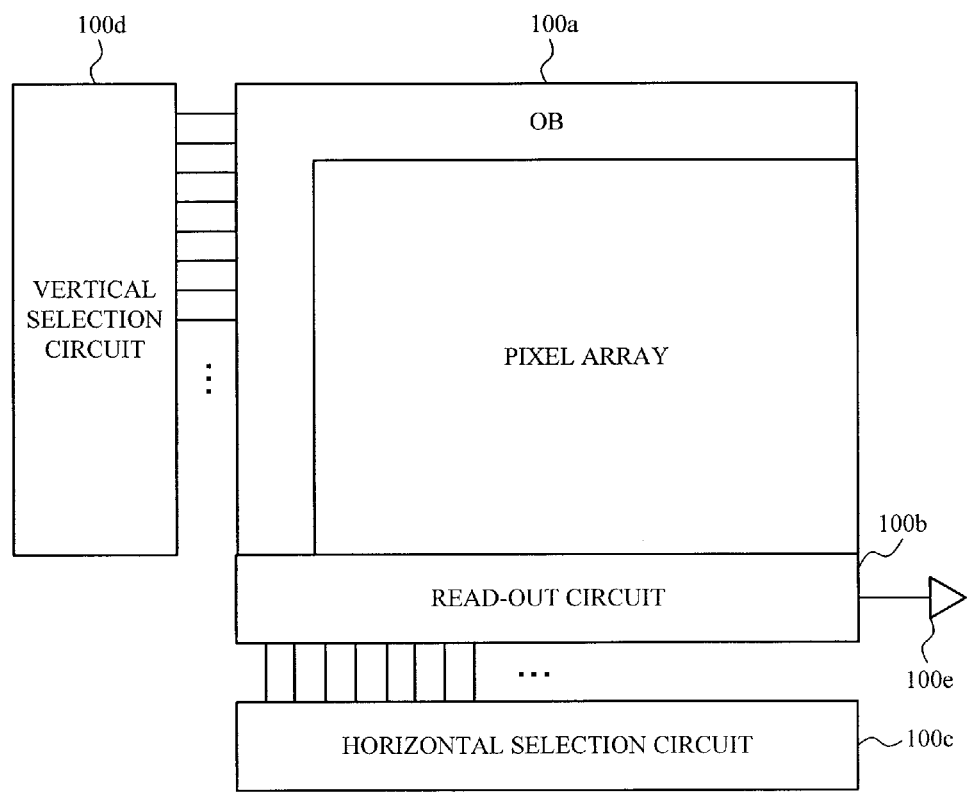
FIG. 2 is a diagram conceptually illustrating a configuration of an image pickup element according to the first embodiment of the present invention.

FIG. 2 conceptually illustrates the configuration of the image pickup element 100. In FIG. 2, the image pickup element includes a pixel array 100a of pixels as photoelectric conversion elements arranged in a two-dimensional matrix form, a vertical selection circuit 100d for selecting a row of the pixel array 100a, and a horizontal selection circuit 100c for selecting a column of the pixel array 100a. The image pickup element 100 further includes a read-out circuit 100b for reading out a signal of a pixel selected by the vertical selection circuit 100d and the horizontal selection circuit 100c from among the pixels arranged in the pixel array 100a.

The pixel array 100a includes a first area including an array of light-shielded pixels (optical black, OB), and a second area including an array of open pixels. The vertical selection circuit 100d selects a row of the pixel array 100a, and makes a read-out pulse output from the TG 101 effective on the selected row based on the horizontal sync signal output from the CPU 103. The read-out circuit 100b includes an amplifier and a memory on the each column basis. A pixel signal on the selected row is stored in the memory in units of columns via the amplifier. The image signal for one row stored in the memory is sequentially selected in the column direction by the horizontal selection circuit 100c, and output to the outside via an amplifier 100e. Accordingly, the pixel in the pixel array 100a can be selectively read out.

The operation is repeated for the number of rows of the pixel array 100a, thereby outputting signals of all the pixels.

The horizontal selection circuit 100c of the image pickup element 100 of this embodiment can select a plurality of ranges of columns of pixels from which image signals are read under control of the CPU 103 based on the setting. For instance, in the pixel array including 0-th to n-th columns, only 0-th to k-th and m-th to n-th columns can be read out. Likewise, the vertical selection circuit 100d reads image signals; this circuit can however select a range of pixels in the vertical direction, that is, the range of rows. This embodiment adopts a configuration that separately sets a read-out range on each of an OB area and a pixel area that are not light-shielded. The setting may be provided in advance in the CPU 103. Furthermore, the settings may be appropriately provided or changed by the operation unit 104. However, in this embodiment, settings are provided by the operation unit 104 for the read-out area of pixels that are not light-shielded.

When an OB pixel selection pulse, not illustrated, input from the TG 101 is at a high level (high), the vertical selection circuit 100d is controlled so as to sequentially select the pixel rows of OB pixels and, after selection of the last row, select the first row of the OB pixels again (cycle operation). For instance, in the case where the 5-th to 14-th rows are OB pixels, when the OB pixel selection pulse is high, the operation of sequentially selecting the 5-th, 6-th, ..., 14-th rows and subsequently selecting the 5-th, 6-th, ..., 14-th rows again is repeated. Repetition of ten times of such an (cyclic) operation outputs OB pixel signals of 100 rows. The operations are controlled by the CPU 103 executing the program, as described above.

Figure 3:
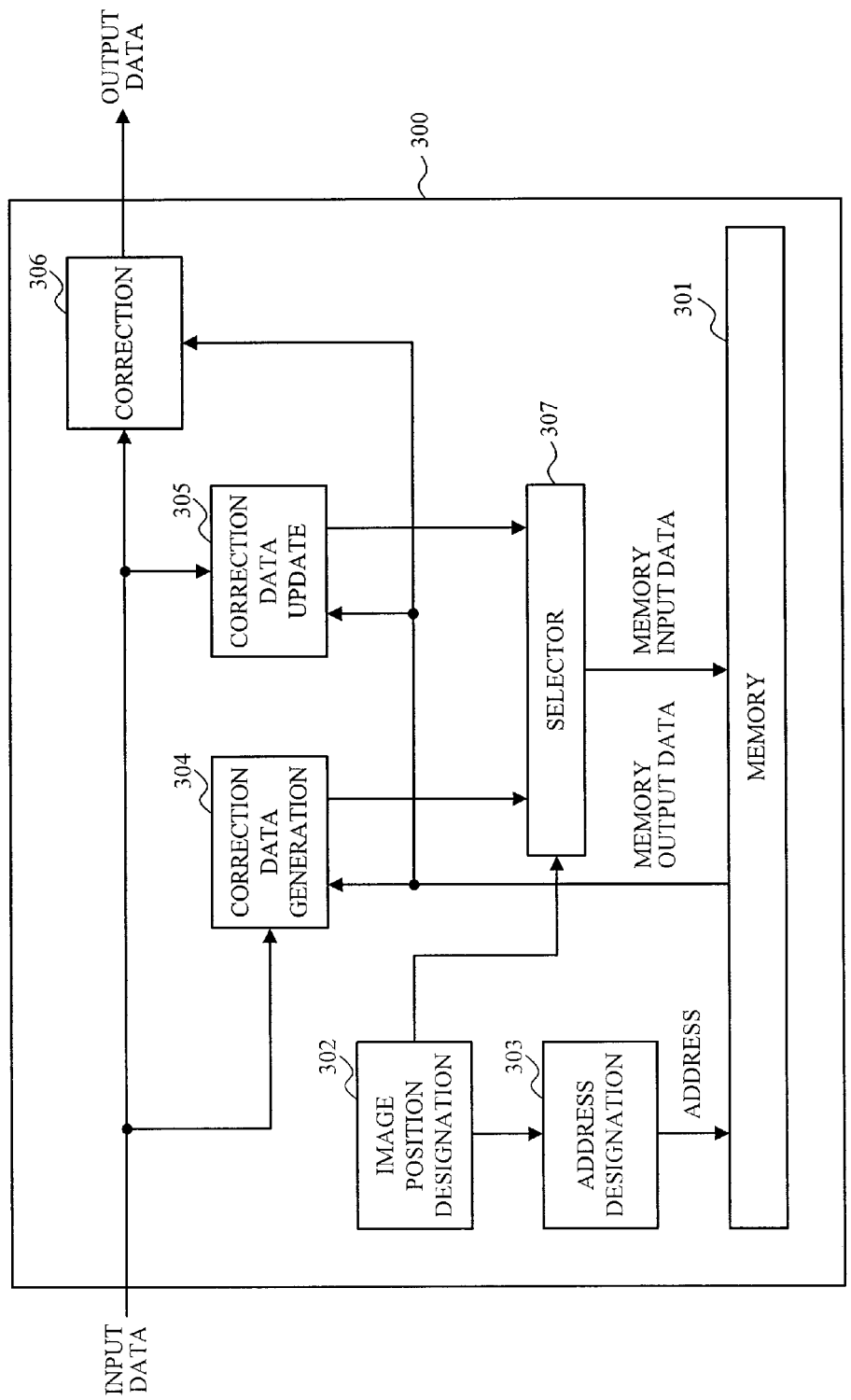
FIG. 3 is a block diagram illustrating a configuration of an image correction unit according to first and second embodiments of the present invention.

FIG. 3 is a block diagram illustrating an example of the configuration of image correction unit 300 included in the image processing unit 108 illustrated in FIG. 1.

In FIG. 3, the memory 301 stores a correction data on each row of the image. The correction data generation circuit 304 generates the correction data of each row of the pixel arrangement using an input data (image data) and a data of calculation progress temporarily stored in the memory 301. The process of generating the correction data is repeated on the each column basis, the correction data already stored in the memory 301 is erased, and subsequently the final correction data is written in the memory 301.

The address designation circuit 303 outputs the address to the memory 301 based on image position information output from the image position designation circuit 302. The memory 301 outputs the data stored in the input address position. The operations associate the column of image data with the address of the correction data on correction of the image data or on generation and updating of the correction data.

Figure 4:
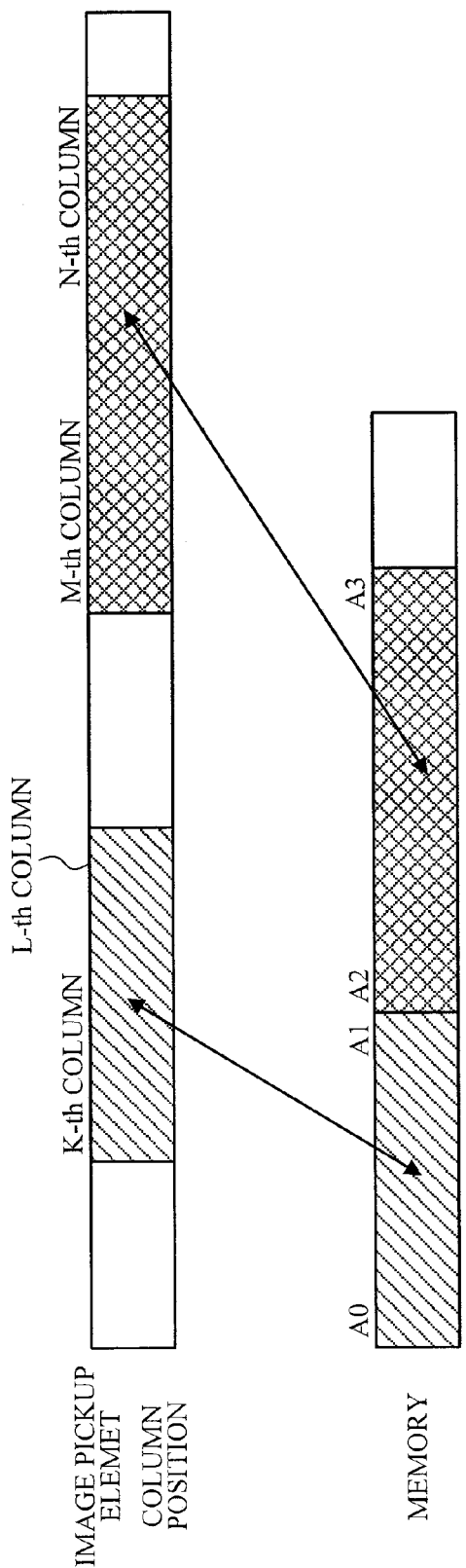
FIG. 4 is a diagram schematically illustrating a memory configuration of the image correction unit according to the first and second embodiments of the present invention.

FIG. 4 illustrates an example of association between the column of the pixel array 100a of the image pickup element 100 and the address of the correction data. The image position designation circuit 302 outputs information on association of the image data input into the image correction unit 300 with K-th to L-th columns of the pixel array 100a, to the address designation circuit 303. The address designation circuit output addresses A0 to A1 to the memory 301 on the basis of input information. The memory 301 inputs and outputs the data stored in the addresses A0 to A1, and generates and updates the correction data and corrects the image data on each of the K-th to L-th columns.

Likewise, when the data on M-th to N-th columns are input into the image correction unit 300, information on association of the image data input into the image correction unit 300 and the M-th to N-th columns of the pixel array 100a is output to the address designation circuit 303. The address designation circuit outputs the addresses A2 to A3 to the memory 301 on the basis of the input information. The memory 301 accepts and outputs the data stored in the input addresses A2 to A3, and generates and updates the correction data and corrects the image data on each of the M-th to N-th columns.

When the correction data is updated, a data is input into the correction data update circuit 305 and the correction data stored in the address corresponding to the column to be updated is input. The correction data update circuit 305 updates the correction data on the basis of a predetermined process. After the updating process is finished, the data to be output from the correction data update circuit is selected by a selector 307 and stored again in the address where the correction data to be updated is stored.

When the image data is corrected, the correction data stored in the address corresponding to the column to be corrected is input into the correction circuit 306. The correction circuit 306 performs a predetermined process on the image data using the correction data to correct the image data and outputs the data as a corrected image data.

Figure 5:
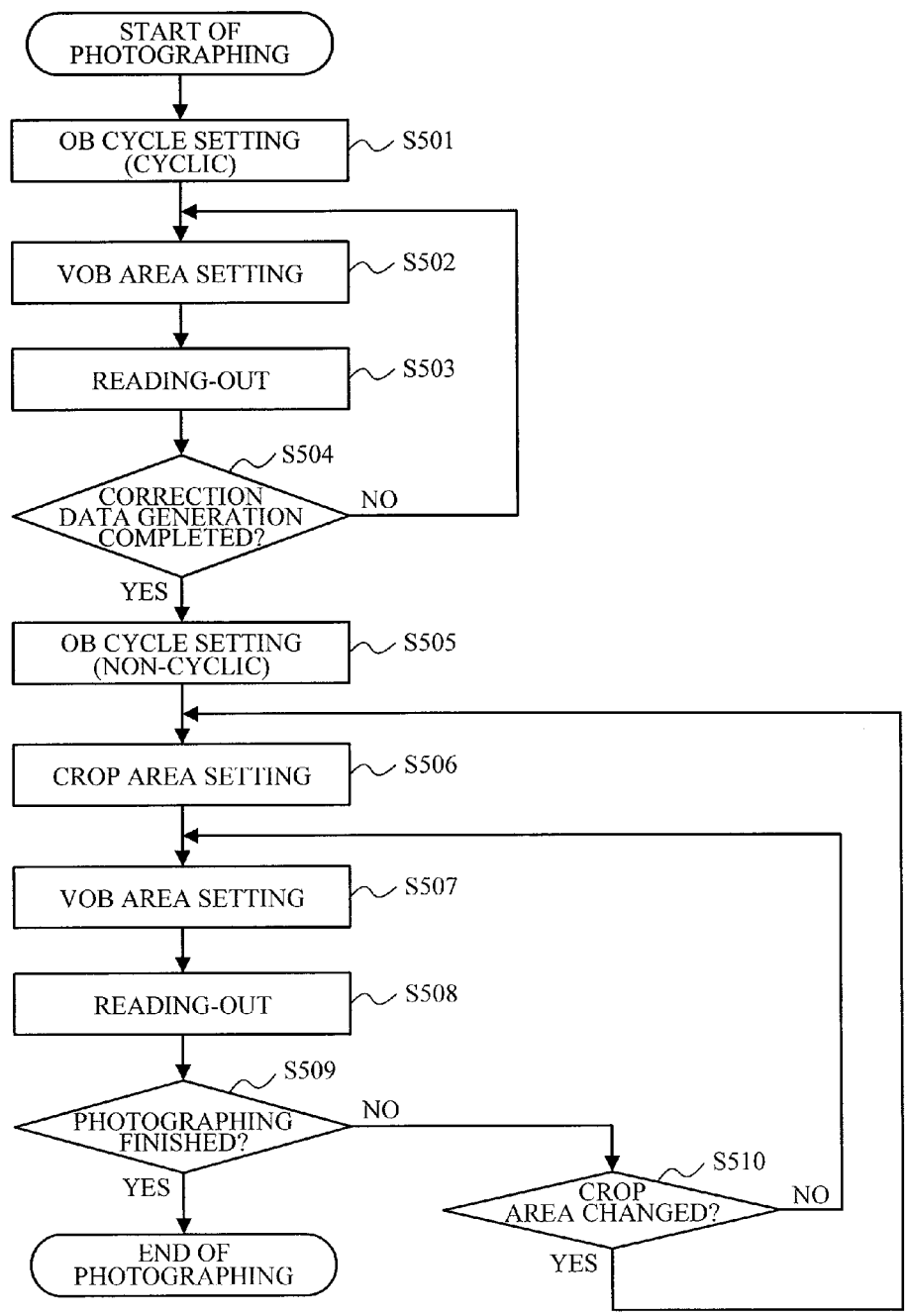
FIG. 5 is a diagram illustrating a flowchart of an operation of the image pickup apparatus according to the first embodiment of the present invention.

FIG. 5 illustrates a flowchart of an operation of the image pickup apparatus according to this embodiment. Referring to FIG. 5, an operation of the image pickup apparatus according to this embodiment will hereinafter be described.

In this embodiment, it is assumed that the user selects a crop mode in which a part of a screen is cut out and displayed, as a moving image photographing mode.

After an operation on the operation unit 104 starts moving image photographing, in step S501, the CPU 103 performs setting for causing the OB pixel selection pulse to be at the high level only in a predetermined time in a time period for reading out the image signal, on the TG 101 (cyclic setting).

Next, in step S502, the CPU 103 sets a read-out area (range of columns) in the horizontal direction, to the horizontal selection circuit 100c.

Figure 6A:
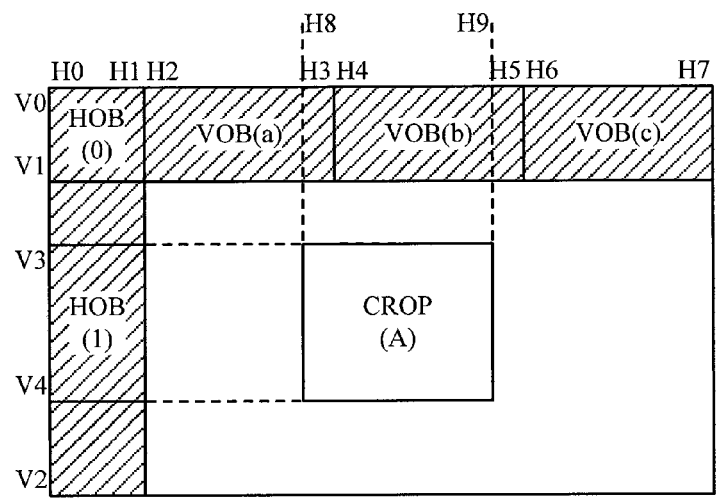
FIGS. 6A and 6B are diagrams conceptually illustrating the arrangement of a read-out area of the image pickup element according to the first embodiment of the present invention.

FIG. 6A is a diagram schematically illustrating the pixel configuration of the pixel array 100a of the image pickup element 100 and the arrangement of the read-out area. Hatched parts in the diagram indicate pixel areas in which light-shielded pixels are arranged. Areas defined (set) by ranges H2 to H7 in the horizontal direction and ranges V0 to V1 in the vertical direction are VOB areas and divided into three areas VOB(a), VOB(b) and VOB(c). Areas defined with denotations H0 to H1 in the horizontal direction and V0 to V2 in the vertical direction are HOB areas, which includes HOB(0), and HOB(1) in a row range identical to that of an after-mentioned crop area.

As described above, the image pickup element 100 can select read-out row and column ranges from the pixel array 100a, and sets the read-out row and column ranges to the HOB area and VOB(a) in step S502.

Figure 7:
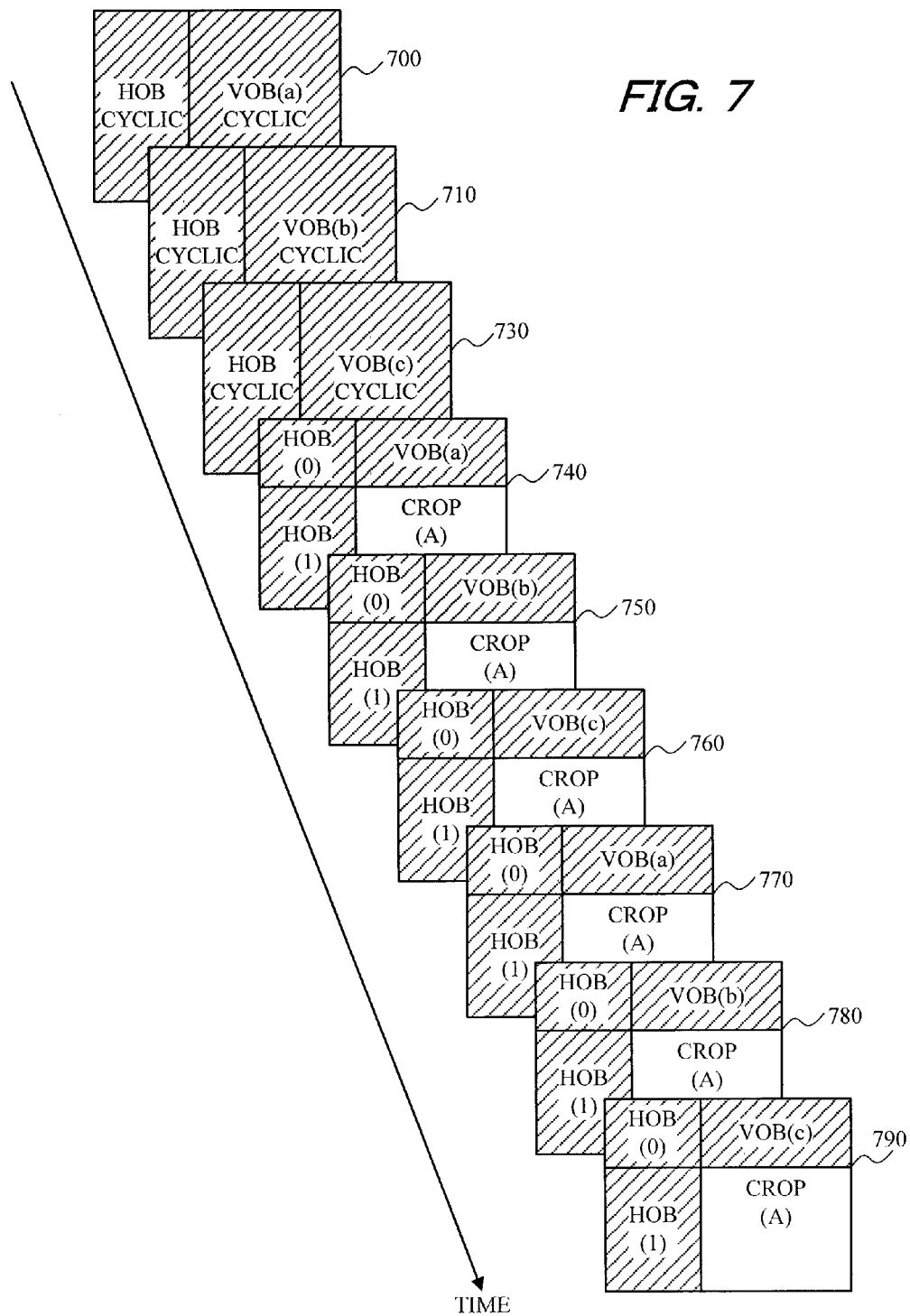
FIG. 7 is a diagram conceptually illustrating a read-out area from the image pickup element according to the first embodiment of the present invention.

Subsequently, in step S503, the CPU 103 starts an operation of reading out an image signal from the pixel array 100a. On readout, the OB pixel selection pulse is at the high level for a predetermined time period, thereby repeatedly reading out the areas V0 to V1 in the vertical direction (cycle operation). As a result, the read-out image includes an HOB cyclic area in which HOB(0) is repeated, and an image signal 700 read out from the VOB(a) cyclic area as illustrated in FIG. 7.

The image is converted into a digital signal by the AFE 102 and subsequently input into the image correction unit 300. In the image correction unit 300, the image data is input into the correction data generation circuit 304, and a correction data is generated on the each column basis based on a predetermined process.

FIGS. 8A to 8I are diagrams schematically illustrating the memory addresses accessed when the correction data is generated. The generated correction data on each of columns H0 to H1 are stored in the addresses h0 to h1 illustrated in hatched parts in FIG. 8A. The correction data on the each column basis in the range H2 to H3 in the VOB(a) area are stored in the addresses h2 to h3. The address h0 corresponds to the column H0 of the pixel array 100a, and the address h2 corresponds to the column H2. The number of correction data in the addresses h0 to h1 is the same as the number of columns H1 to H1. Likewise, the number of correction data in the addresses h2 to h3 is the same as the number of columns H2 to H3.

Next, in step S504, the CPU 103 determines whether correction data generation is finished or not. At this time, the correction data generation on the columns H0 to H3 of the image pickup element 100 is finished, but the correction data on the columns H4 to H7 are not generated. Accordingly, the processing returns to step S502.

In step S502, the CPU 103 sets the range of columns in the pixel array 100a from which the image signal is read, to the HOB area and the VOB(b).

Subsequently, in step S503, the CPU 103 causes the image pickup element 100 to start the operation of reading out an image signal. On readout, the OB pixel selection pulse is at the high level in a predetermined time period, and the areas V0 to V1 in the vertical direction is repeatedly read out (cycle operation). As a result, the read out image signal includes an image signal 710 read out from the HOB cyclic area in which HOB(0) is repeated, and the VOB(b) cyclic area as illustrated in FIG. 7.

The image signal is converted into a digital signal by the AFE 102 and subsequently input into the image correction unit 300. In the image correction unit 300, the image data is input into the correction data generation circuit 304, and the correction data is generated based on a predetermined process. The correction data on the columns H0 to H1 have already been generated. Accordingly, the data is not generated in this step.

The correction data generated at this time is stored in the addresses h4 to h5 (hatched parts in FIG. 8B) corresponding to the columns H4 to H5 in the VOB(b) area. The number of correction data in the addresses h4 to h5 is the same as the number of columns included in H4 to H5.

Next, in step S504, the CPU 103 determines whether the correction data generation is finished or not. At this time, correction data generation on the columns H0 to H5 of the image pickup element 100 is finished, but the correction data on the columns H6 to H7 is not generated. Accordingly, the processing returns to step S502.

Subsequently, as with the above operation, the correction data in columns H6 to H7 in the VOB(c) area is stored in the memory addresses h6 to h7.

The correction data generation on all the columns of pixel array is finished. Accordingly, the determination in step S504 advances the processing to step S505.

In step S505, the CPU 103 performs setting of causing the OB pixel selection pulse to be at the low level in a predetermined time in the read-out time period, to the TG 101 (non-cyclic setting).

Next, in step S506, a read-out pixel range is selected among pixels that are not light-shielded (open pixels). As described above, in this embodiment, the pixel range (crop area) from which the image signal is to be read out is designated in advance according to an operation by the user on the operation unit 104. The CPU 103 performs setting of reading out a crop (A) area defined by a column range H8 to H9 and a row range V3 to V4 illustrated in FIG. 6A, to the image pickup element 100 on the basis of the designation.

Subsequently, in step S507, the read-out range of VOB is set to the VOB(a) area. As will be described later, this setting is for obtaining the image signal for updating the correction data stored in the memory. More specifically, the HOB(0), HOB(1), VOB(a) and crop (A) areas are set.

After the setting, in step S508, the CPU 103 causes the image pickup element 100 to start a read-out operation. As illustrated in FIG. 7, the read-out image signal includes an image signal 740 read out from the HOB(0), HOB(1), VOB(a) and crop (A) areas.

Figure 8A:
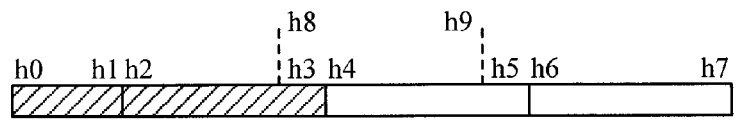
FIGS. 8A, 8B, 8C, 8D, 8E, 8F, 8G, 8H and 8I are diagrams schematically illustrating memory access in storing a correction data by an image correction unit according to the first embodiment of the present invention.
Figure 8B:
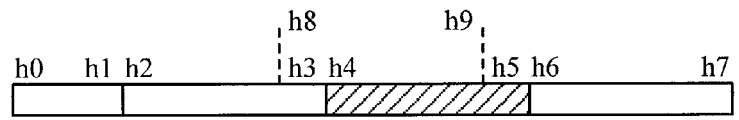
Figure 8C:
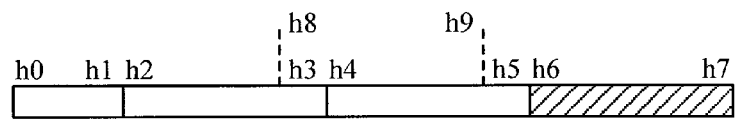
Figure 8D:
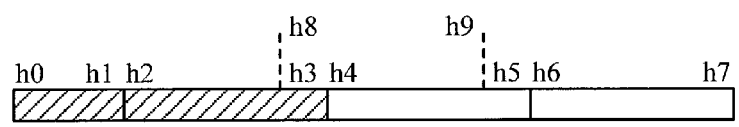

The image signal is converted into a digital signal by the AFE 102 and subsequently input into the image correction unit 300. In the image correction unit 300, the image data in the HOB(0) and VOB(a) areas are input into the correction data update circuit 305, and the correction data is updated based on a predetermined process. FIG. 8D illustrates memory addresses accessed on updating. When the data in the HOB(0) area is updated, the correction data stored in the addresses h0 to h1 are output from the memory 301, the correction data is updated and subsequently stored in the addresses h0 to h1 again. When the correction data in the VOB(a) area is updated, the correction data stored in the addresses h2 to h3 are output from the memory 301, the correction data is updated and subsequently stored in the addresses h2 to h3 again.

Figure 9A:
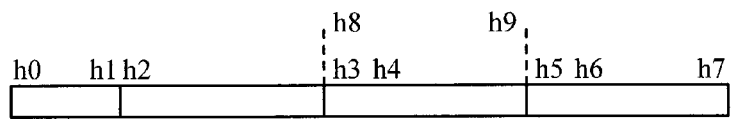
FIGS. 9A, 9B, 9C, 9D, 9E, 9F, 9G, 9H and 9I are diagrams schematically illustrating memory access in storing the correction data by the image correction unit according to the first embodiment of the present invention.
Figure 9B:
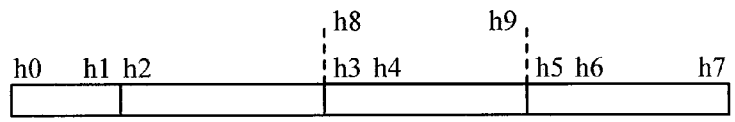
Figure 9C:
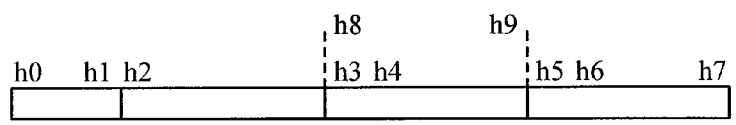
Figure 9D:
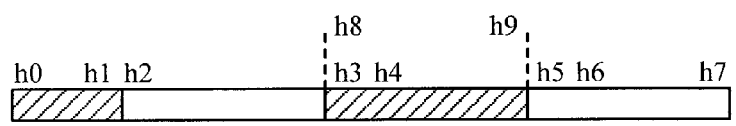

As described above, the image data in the crop (A) area is corrected on the each column basis based on the updated correction data. FIG. 9D illustrates memory addresses to be accessed in correction. When the data in the HOB(1) area is corrected, the correction data stored in the addresses h0 to h1 are output from the memory 301 and the image data is corrected on the each column basis. When the data in the crop (A) area is corrected, the correction data stored in the addresses h8 to h9 are output from the memory 301 and the image data is corrected on the each column basis. The address h8 corresponds to the H8 column of the pixel array 100a. The address h9 corresponds to the H9 column of the pixel array. The number of correction data in the addresses h8 to h9 is the same as the number of pixels included in the H8 to H9.

According to the above operation, in one readout (one frame), after the correction data in the VOB area (a) is updated, the image data in the crop (A) area can be corrected.

Next, in step S509, the CPU 103 determines whether photographing is finished or not. If not finished, the processing proceeds to step S510. In step S510, it is determined whether the crop area is changed by the user or not. If the crop area is not changed, the processing returns to step S507 and the next frame is read out.

In step S507, the VOB(b) is set as the VOB area to be read out in the next frame. The setting is for updating the correction data (addresses h4 to h5) in the VOB area. More specifically, the HOB(0), HOB(1), VOB(b) and crop (A) areas are set.

After setting, in step S508, the CPU 103 causes the image pickup element 100 to start a pixel read-out operation. As illustrated in FIG. 7, the read out image signal includes an image signal 750 read out from the HOB(0), HOB(1), VOB(b) and crop (A) areas.

Figure 8E:
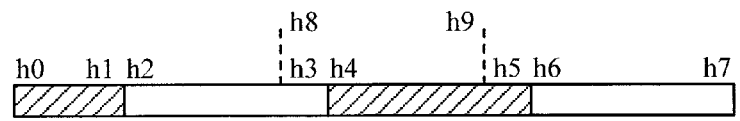
Figure 8F:
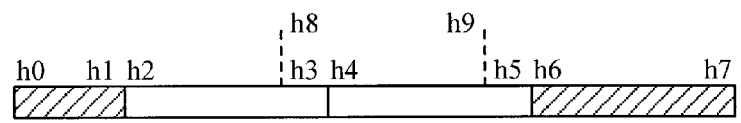
Figure 8G:
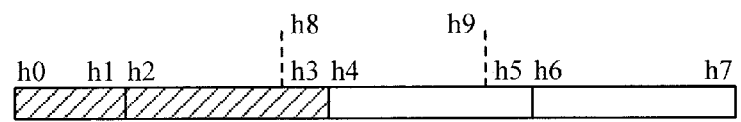
Figure 8H:
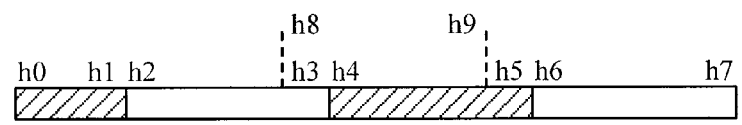
Figure 8I:
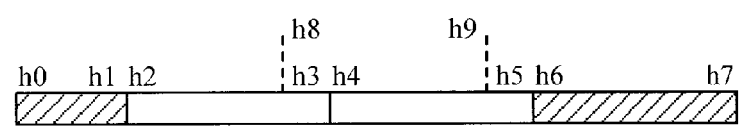

The image signal is converted into a digital signal by the AFE 102 and subsequently input into the image correction unit 300. In the image correction unit 300, the image data in the HOB(0) and VOB(b) areas are input into the correction data update circuit 305 and the correction data is updated based on a predetermined process. FIG. 8E illustrates memory addresses accessed on updating. When the data in the HOB(0) area is updated, the correction data stored in the addresses h0 to h1 is output from the memory 301, the correction data is updated and subsequently stored in the addresses h0 to h1 again. When the data in the VOB(b) area is updated, the correction data stored in the addresses h4 to h5 are output from the memory 301, the correction data is updated and subsequently stored in the addresses h4 to h5 again.

Figure 9E:
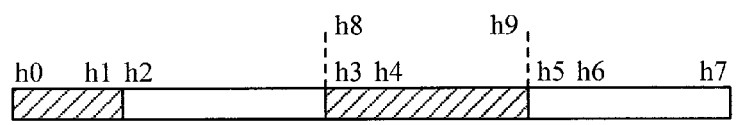

The image in the crop (A) area is corrected on the each column basis, based on the correction data updated as described above. FIG. 9E illustrates memory addresses to be accessed on correction. When the data in the HOB(1) area is corrected, the correction data stored in the addresses h0 to h1 is output from the memory 301 and the image data is corrected on the each column basis. When the data in the crop (A) area is corrected, the correction data stored in the addresses h8 to h9 is output from the memory 301 and the image data is corrected on the each column basis.

Figure 9F:
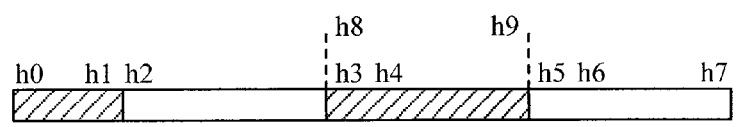
Figure 9G:
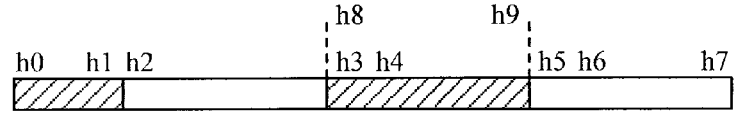
Figure 9H:
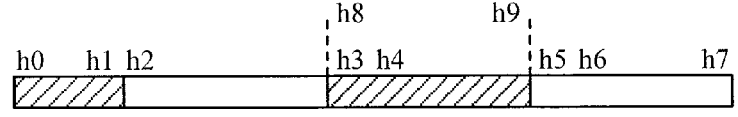
Figure 9I:
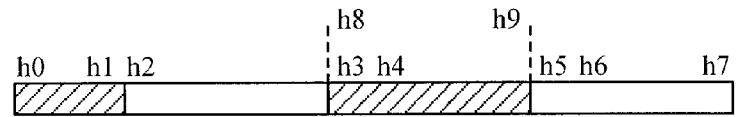

Likewise, when the crop area is not changed, the VOB(c) is selected in the next frame and read out in a manner 760 in FIG. 7, and the correction data is updated (FIG. 8F) and the image data is corrected (FIG. 9F).

Until the user changes the crop area, the VOB area for updating the correction data is sequentially changed and set as illustrated in manners 770 to 790 illustrated in FIG. 7, the operation of reading out the image signal is repeated, and the correction data is updated and the image data is corrected.

Figure 6B:
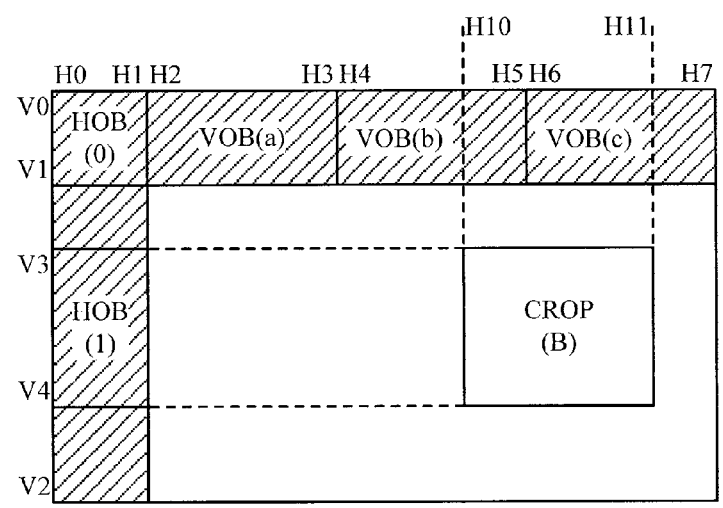

In step S510, if it is determined that the crop area is changed, the processing returns to step S506 and the CPU 103 resets the read-out open pixel area in the image pickup element 100. FIG. 6B illustrates the area in this case. The changed crop area has ranges H10 to H11 in the horizontal direction and ranges V3 to V4 in the vertical direction.

Figure 10:
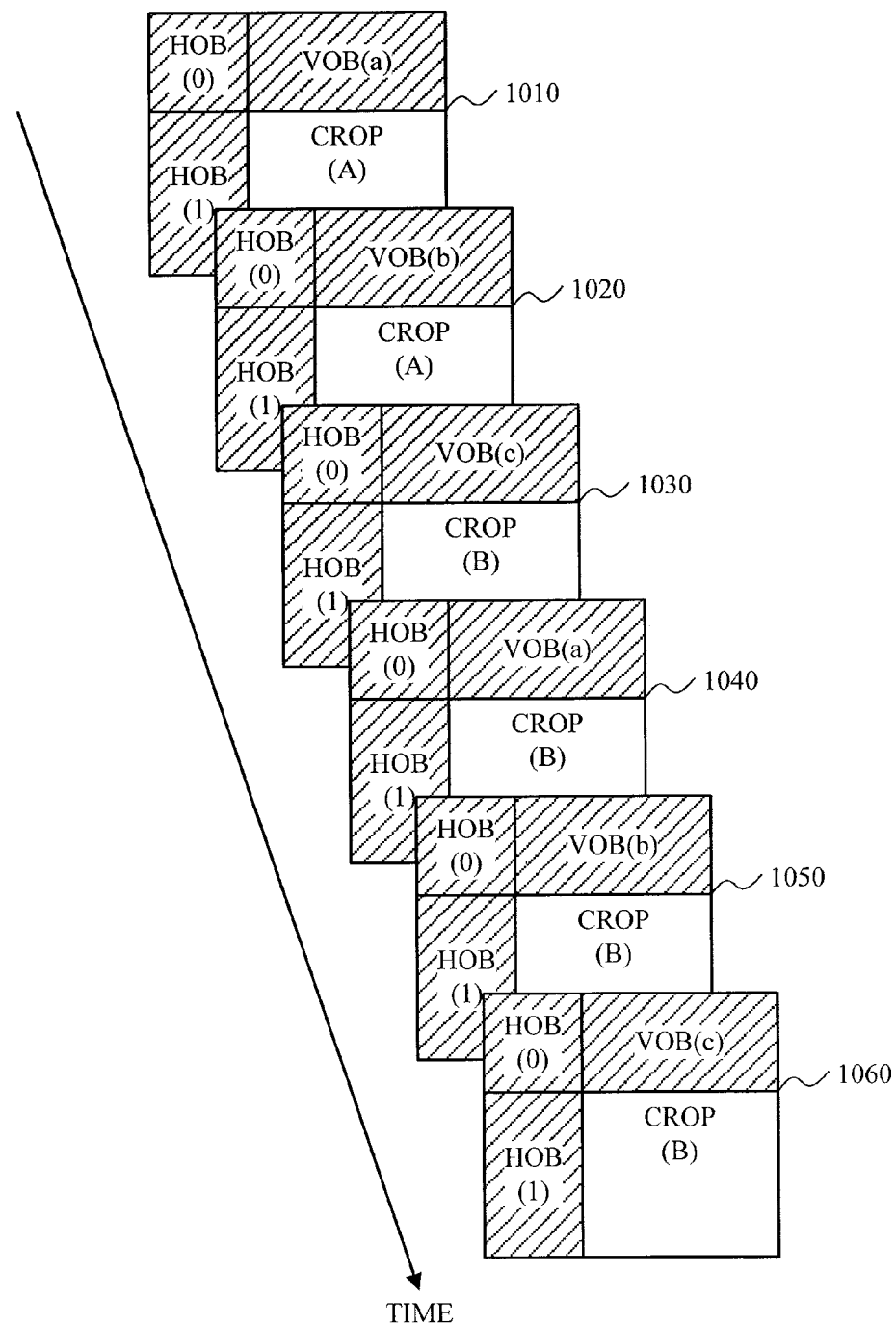
FIG. 10 is a diagram conceptually illustrating a read-out area from the image pickup element according to the first embodiment of the present invention.

It is provided that, at the time 1030 illustrated in FIG. 10, in step S506, the change of the crop area is determined. The operation is repeated therebefore. The time 1010 to 1060 in FIG. 10 corresponds to after-mentioned FIGS. 11A to 11F and FIGS. 12A to 12F.

Subsequently, in step S507, setting of reading out the VOB(c) area as the read-out column of VOB is performed. The setting is for updating the correction data of the next VOB(c) after the correction data is updated in the VOB(b) in readout of the previous frame. More specifically, the HOB(0), HOB(1), VOB(c) and crop (B) areas are set as the read-out areas.

After the setting, in step S508, the CPU 103 causes the image pickup element 100 to start the operation of reading out the image signal. As illustrated in FIG. 10, the read-out image signal is an image signal 1030 read out from the HOB(0), HOB(1), VOB(c) and crop (B) areas.

Figure 11A:
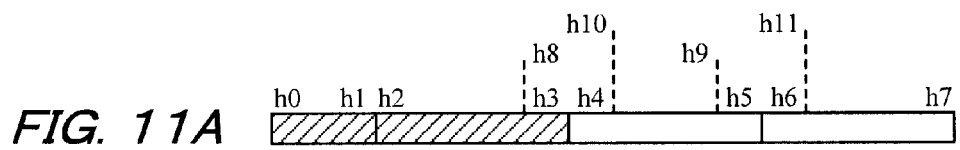
FIGS. 11A, 11B, 11C, 11D, 11E and 11F are diagrams schematically illustrating memory access in storing the correction data by the image correction unit according to the first embodiment of the present invention.
Figure 11B:
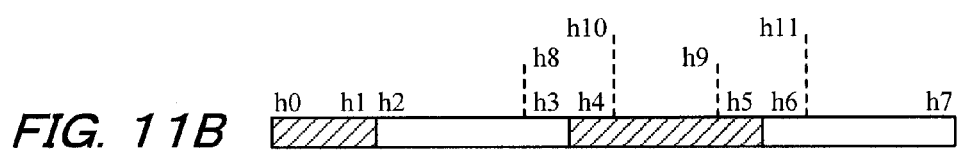
Figure 11C:
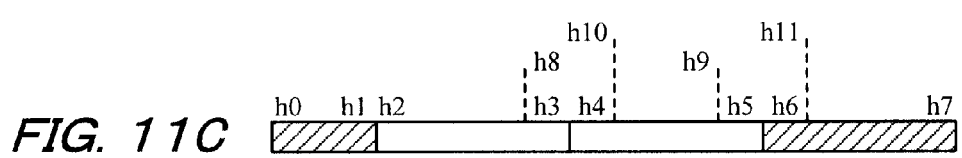
Figure 11D:
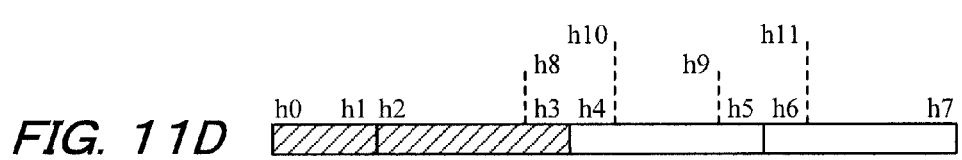
Figure 11E:
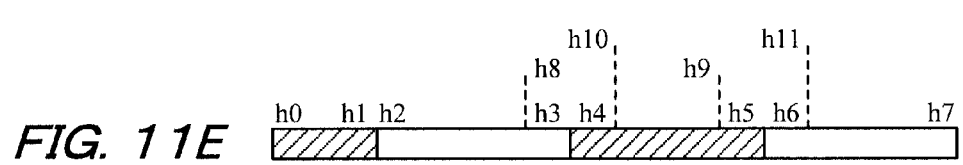
Figure 11F:
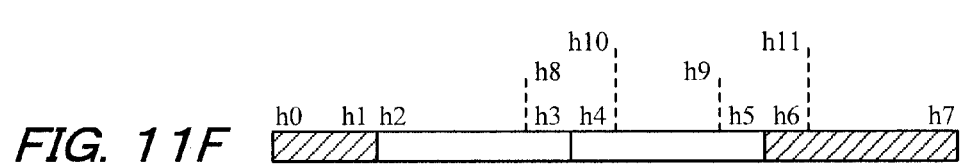

The image signal 1030 is converted into a digital signal by the AFE 102 and subsequently input into the image correction unit 300. In the image correction unit 300, the image data in the HOB(0) and VOB(c) areas are input into the correction data update circuit 305, and the correction data is updated based on a predetermined process. FIG. 11C illustrates memory addresses accessed on updating. When the data in the HOB(0) is updated, the correction data stored in the addresses h0 to h1 is output from the memory 301 and the correction data is updated and subsequently stored in the addresses h0 to h1 again. When the data in the VOB(c) area is updated, the correction data stored in the addresses h6 to h7 is output from the memory 301, the correction data is updated and subsequently stored in the addresses h6 to h7 again.

Figure 12A:
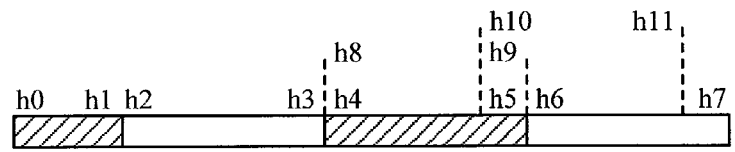
FIGS. 12A, 12B, 12C, 12D, 12E and 12F are diagrams schematically illustrating memory access in reading the correction data by the image correction unit according to the first embodiment of the present invention.
Figure 12B:
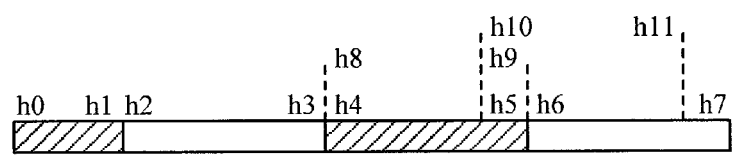
Figure 12C:
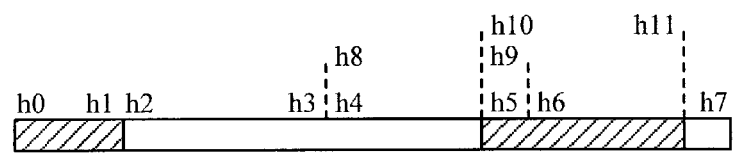
Figure 12D:
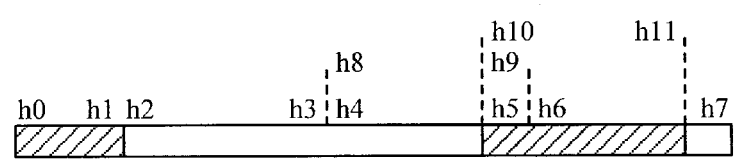
Figure 12E:
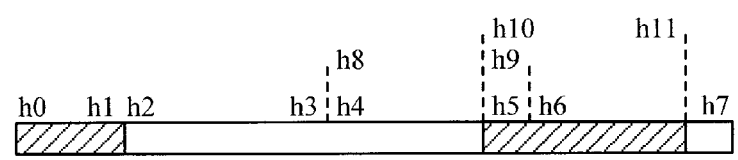
Figure 12F:
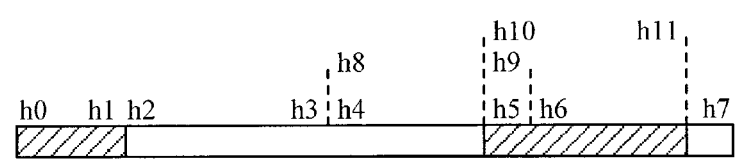

The image data in the crop (B) area is corrected on the each column basis, based on the correction data updated as described above. FIG. 12C illustrates memory addresses to be accessed on correction. When the data in the HOB(1) area is corrected, the correction data stored in the addresses h0 to h1 is output from the memory 301 and the image data is corrected on the each column basis. When the data in the crop (B) area is corrected, the correction data stored in the addresses h10 to h11 is output from the memory 301, and the image data is corrected on the each column basis.

Subsequently, if the crop area is not changed, processes in steps S509 and S510 are performed to repeat readout of the frame (1040 to 1060 in FIG. 10). The image data on each frame being read out and corrected is stored in the RAM 107 and subsequently compressed by the image processing unit 108 and stored as a moving image in the recording unit 109.

As described above, the VOB area to be read out on readout of each frame is sequentially changed from VOB(a) to VOB(b) and to VOB(c). The correction data is generated and updated using the image data read out from each VOB area, and stored in memory addresses corresponding to the area. Accordingly, the correction data on all the columns in the pixel array 100a of the image pickup element 100 can be held in the memory while always updating the correction data. When the image data is corrected, the image data can be corrected on the each column basis by accessing the image data to be corrected in the memory address corresponding to the column on the pixel array.

According to the above configuration, even when the crop area is changed, only access to the memory address corresponding to each pixel column in the changed crop area allows correction based on the correction data corresponding to the column of the image data. Accordingly, elimination of the frame of the image data due to regeneration of the correction data can be prevented.

Second Embodiment

Next, a second embodiment of the present invention will be described.

Figure 13:
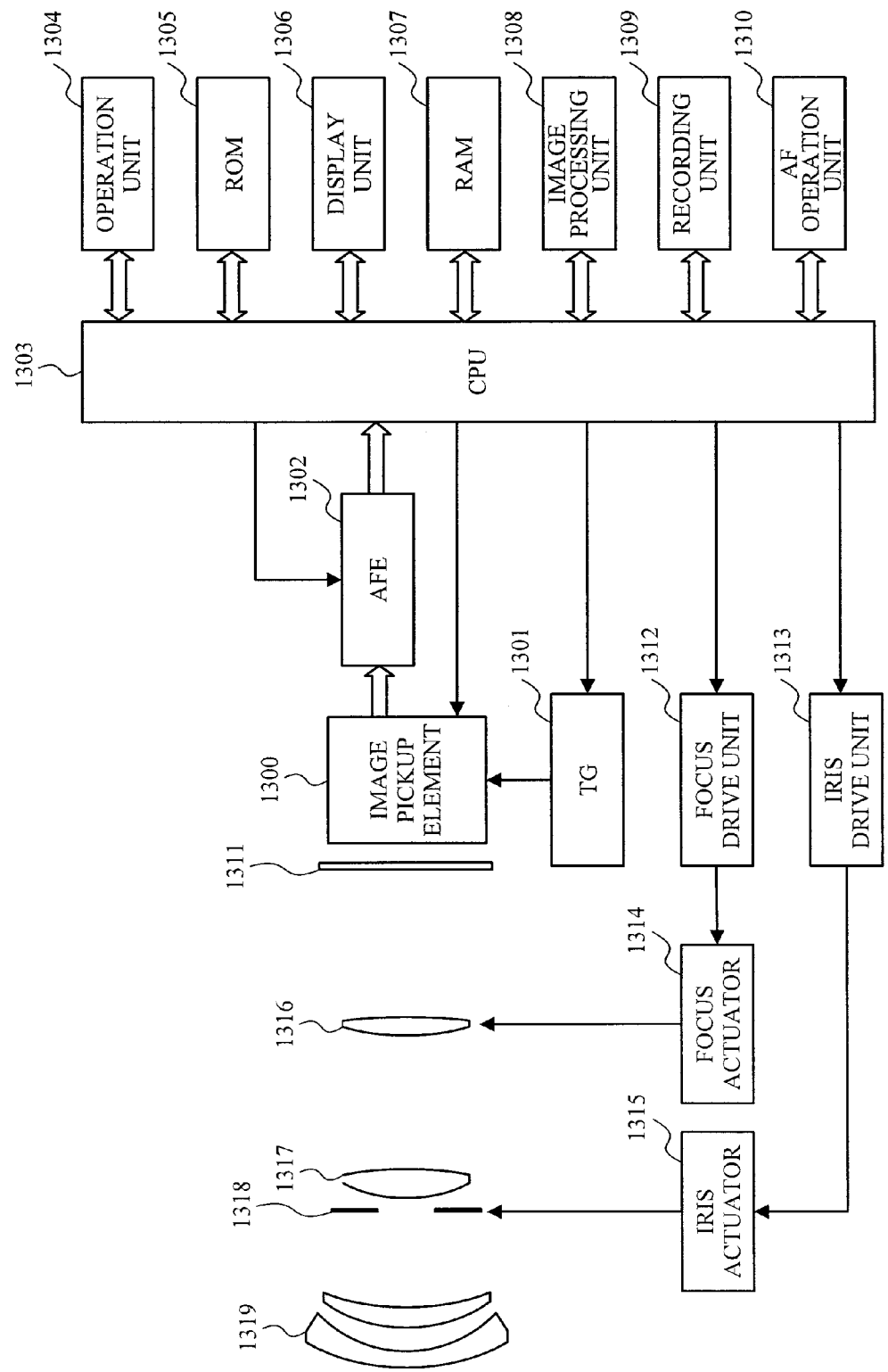
FIG. 13 is a block diagram illustrating a configuration of an image pickup apparatus according to a second embodiment.

FIG. 13 is a block diagram illustrating a configuration of an image pickup apparatus according to the second embodiment of the present invention.

The illustrated image pickup apparatus has a function of photographing a moving image using an auto focus (AF) function (focus detection unit), and includes an image pickup element 1300 that picks up an image of an object and obtains an image signal. The image pickup element 1300 includes a pixel arrangement for converting an electric signal (analog signal, i.e., image signal) through photoelectric conversion. The image pickup element of the image pickup apparatus according to this embodiment has a pixel configuration including after-mentioned two photoelectric conversion elements (A and B) to allow an image signal for performing the AF function to be read out. Accordingly, the image pickup element has a configuration that can output an image signal (image A signal) of the photoelectric conversion element A, an image signal (image B signal) of the photoelectric conversion element B, or an image A+B signal. In this embodiment, only readout of the image A+B signal and the image A signal allows the image B signal to be calculated according to a predetermined process. Accordingly, the image A signal and the image A+B signal are read out. The image A+B signal is used as the image signal. The image A signal of the corresponding pixel is subtracted from the image A+B signal to create the image B signal, which is used for AF calculation together with the image A signal. Accordingly, the configuration is adopted where the correction data is generated and updated for each of the image A signal and the image A+B signal.

In this diagram, the gain of an analog signal output from the image pickup element 1300 is adjusted by an analog front end (AFE) 1302, and the signal is converted into a digital signal (image data) according to a predetermined quantization bit. The drive timing for the image pickup element 1300 and the AFE 1302 is controlled by a timing generator (TG) 1301. The TG 1301 itself is controlled by a CPU 1303 executing a control program.

A RAM 1307 is a memory for storing an image data output from the AFE 1302 and an image data processed by an after-mentioned image processing unit 1308. The RAM 1307 is used also as a working memory by the after-mentioned CPU 1303. Here, the RAM 1307 is used as the image memory and the working memory. However, other memory may be used only if the memory has an access speed level that does not cause a problem.

A ROM 1305 stores a program be executed on the CPU 1303. In this embodiment, a flash ROM is used as the ROM 1305. However, other memory instead of the flash ROM may be used only if the memory has an access speed level that does not cause a problem.

The CPU 1303 loads the program stored in the ROM 3105, and executes the program, thereby integrally controlling the image pickup apparatus. The image processing unit 1308 performs processes, such as correction and compression of an image data obtained through photographing, and includes an after-mentioned image correction unit 300.

A recording unit 1309 includes, for instance, a recording medium, such as a nonvolatile memory or hard disk, and records image data, such as a still image data and moving image data and information related thereto in the recording medium. In the illustrated example, the recording unit 1309 is included in the image pickup apparatus. Instead, this unit may be an external recording device including a recording medium, such as a nonvolatile memory or a hard disk, detachably attached via a connector.

An operation unit 1304 is used for inputting an instruction by a user and setting information when setting of a photographing command, an image pickup condition and the like is performed to the CPU 1303. A display unit 1306 displays a still image and a moving image obtained through photographing and a menu screen under control of the CPU 1303.

A first lens group 1319 is disposed at the distal end of a photographing optical system (focusing optical system), and held movably forward and backward in the optical axis direction. An iris 1318 adjusts the aperture diameter to perform light amount adjustment when photographing. There is also disposed a second lens group 1317. The iris 1318 and the second lens group 1317 move forward and backward in the optical axis direction in an integrated manner, and cooperate with the operation of the first lens group 1319 moving forward and backward to perform a magnification operation (zooming function).

A third lens group 1316 adjusts the focal point by moving forward and backward in the optical axis direction.

A focal plane shutter 1311 adjusts an exposure time on still image photographing. This embodiment adopts the configuration where the focal plane shutter adjusts the exposure time of the image pickup element 1300. However, the configuration is not limited thereto. Instead, a configuration may be adopted where the image pickup element 1300 includes an electronic shutter function and adjusts the exposure time according to control pulses under control of the CPU 1303.

A focus drive unit 1312 controls driving of a focus actuator 1314 on the basis of a focus detection result of an AF calculator 1310 and drives the third lens group 1316 to move forward and backward in the optical axis direction to adjust the focal point. An iris driver 1313 controls driving of the iris actuator 1315 to control the aperture of the iris 1318.

Figure 14A:
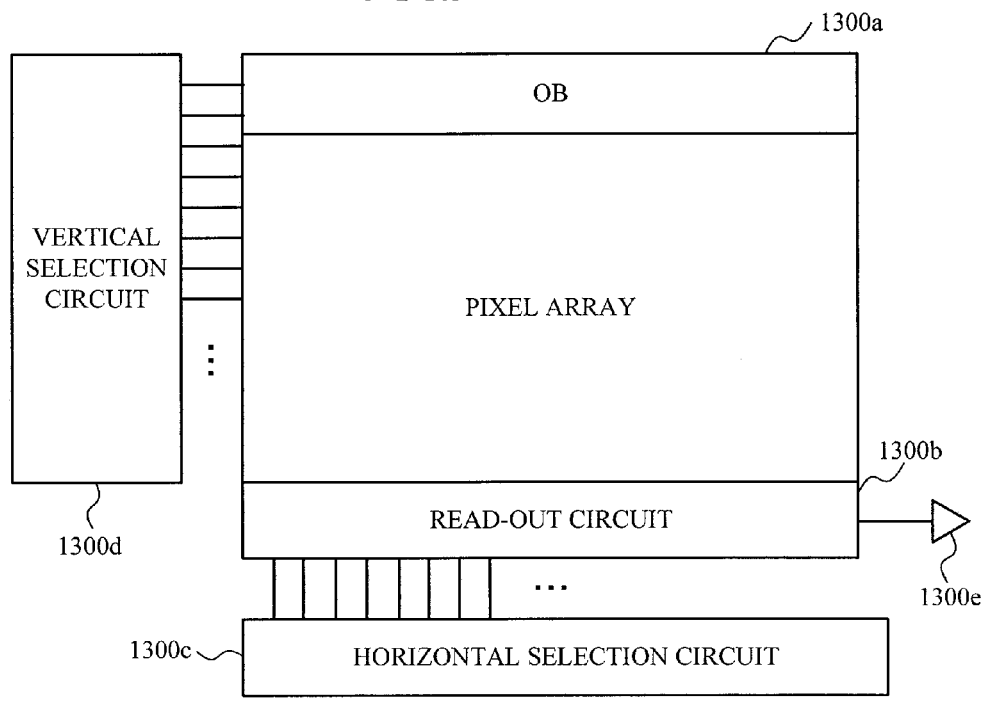
FIGS. 14A and 14B are diagrams conceptually illustrating a configuration of an image pickup element according to the second embodiment of the present invention.

FIG. 14A conceptually illustrates the configuration of the image pickup element 1300. In FIG. 14A, the image pickup element includes a pixel array 1300a of pixels as photoelectric conversion elements arranged in a two-dimensional matrix form, a vertical selection circuit 1300d for selecting a row of the pixel array 1300a, and a horizontal selection circuit 1300c for selecting a column of the pixel array 1300a. The image pickup element 1300 includes a read-out circuit 1300b for reading a signal of a pixel selected by the vertical selection circuit 1300d and the horizontal selection circuit 1300c among the pixels arranged in the pixel array 1300a.

A part of the pixel arrangement of the pixel array 1300a includes the arrangement of the light-shielded pixel (OB). The vertical selection circuit 1300d selects a row of the pixel array 1300a, and makes the read-out pulse output from the TG 1301 effective on the selected row based on the horizontal sync signal output from the CPU 1303. The read-out circuit 1300b includes an amplifier and a memory on the each column basis. A pixel signal on the selected row is stored in the memory in units of columns via the amplifier. The image signal for one row stored in the memory is sequentially selected in the column direction by the horizontal selection circuit 1300c, and output to the outside via an amplifier 1300e.

The operation is repeated for the number of rows of the pixel array 1300a, thereby outputting signals of all the pixels to the outside.

When OB pixel selection pulse, not illustrated, input from the TG 1301 is at a high level (high), the vertical selection circuit 1300d is controlled so as to sequentially select the pixel rows of OB pixels and, after selection of the last row, select the first row of the OB pixels again (cycle operation). For instance, if the 5-th to 14-th rows are OB pixels, when the OB pixel selection pulse is high, operations of sequentially selecting the 5-th, 6-th, . . . , 14-th rows and subsequently selecting the 5-th, 6-th, . . . , 14-th rows again are repeated. Repetition of ten times of such an operation outputs OB pixel signals of 100 rows. The operations are controlled by the CPU 1303 executing the program as described above.

Figure 14B:
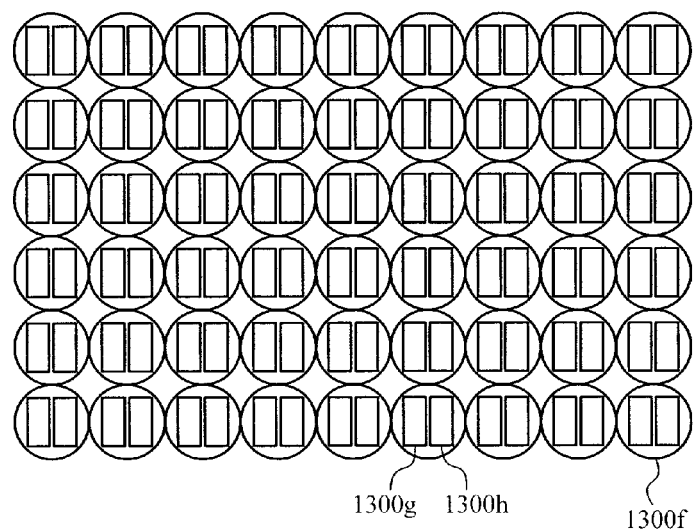

In view of the structure of the pixel array illustrated in FIG. 14B, the image pickup element 1300 according to this embodiment can also output a data for phase difference distance measurement, while outputting an image.

FIG. 14B conceptually illustrates the arrangement configuration of pixels of the pixel array 1300a. The pixel array 1300a includes a plurality of pixels arranged in a two-dimensional matrix form to provide a two-dimensional image. This diagram illustrates microlenses 1300f, and photodiodes (PD) 1300g and 1300h for photoelectric conversion. Each pixel includes two PDs. One microlens is disposed over each pixel. The pixels are arranged in the horizontal and vertical directions.

It is hereinafter assumed that a signal of the left PD 1300g is referred to as configures an image A data, and a signal of the right PD 1300h is referred to as configures an image B data. As described above, the image pickup element 1300 can control pixel reading to allow the image A data, the image B data or the image A+B data to be output. Readout of the image A+B signal and the image A signal allows the image B signal to be calculated according to a predetermined process. Accordingly, the image A signal and the image A+B signal are read out.

The image A+B signal is used as the image signal. The image A signal of the corresponding pixel is subtracted from the image A+B signal to thereby create the image B signal, which is used for an after-mentioned auto focus (AF) operation together with the image A signal.

As to the column of the pixel area (AF area) from which the image A signal is read out, an operation on the operation unit 1304 by the user can change settings of the image pickup element 1300. Furthermore, the read-out area of the image A signal of the OB part can be set separately from the open pixel area. The settings can be configured in the CPU 1303 in advance or may be configured so as to be appropriately set or changed by the operation unit 1304. In this embodiment, setting by the operation unit 1304 can be performed to the read-out area of the pixels that are not light-shielded.

The image processing unit 1308 includes the image correction unit 300 described in the first embodiment. Accordingly, in the following description, the control configuration of the corresponding relationship between the storing address for storing the generated or updated correction data in the memory and each column of the pixel array is analogous to that of the first embodiment.

Figure 15:
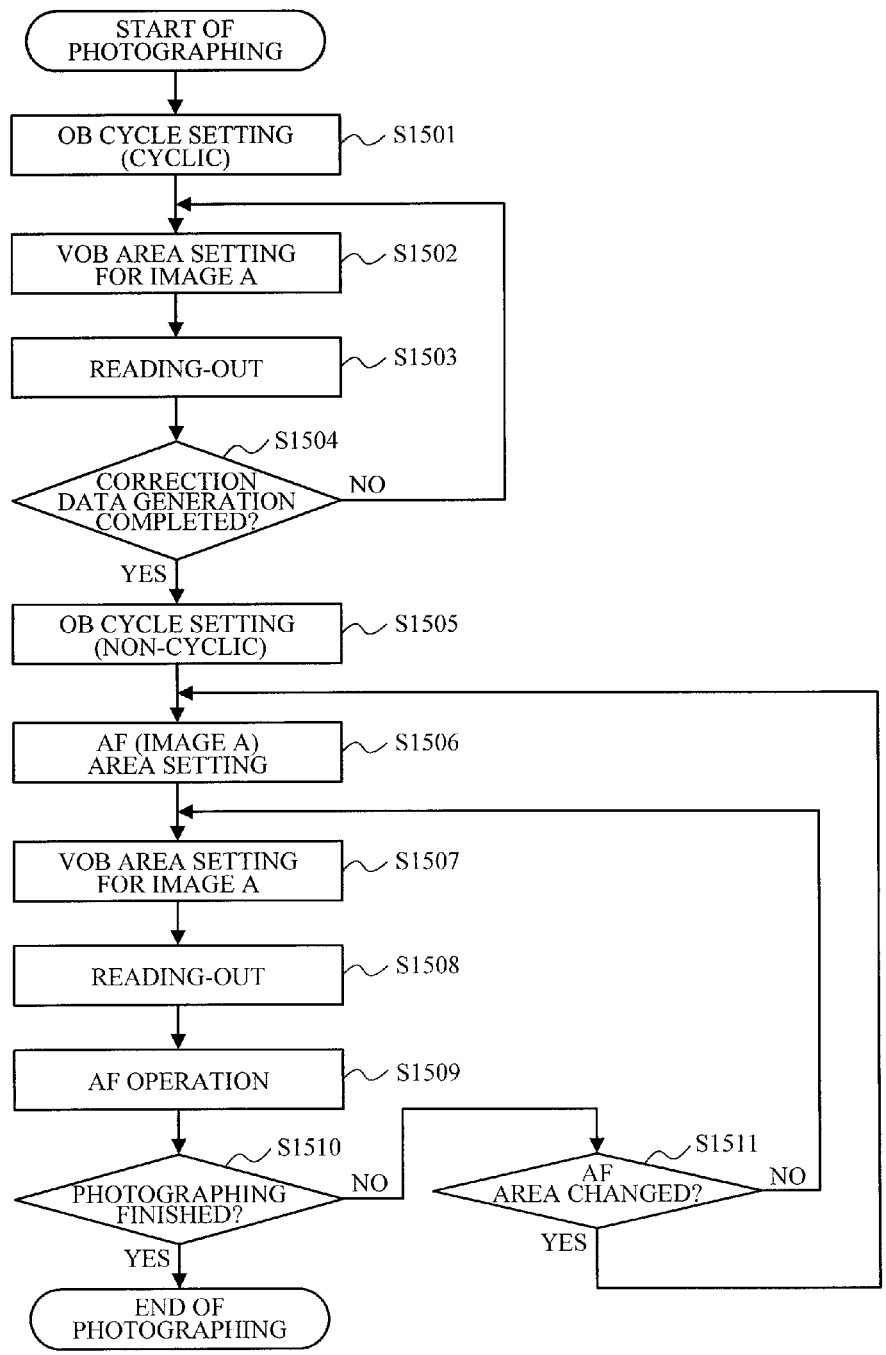
FIG. 15 is a diagram illustrating a flowchart of the image pickup apparatus according to the second embodiment of the present invention.

FIG. 15 is a flowchart illustrating an operation of the image pickup apparatus according to this embodiment. Referring to FIG. 15, the operation of the image pickup apparatus according to this embodiment will be described.

After an operation on the operation unit 1304 starts moving image photographing, in step S1501, the CPU 1303 performs setting for causing the OB pixel selection pulse to be at the high level only for a predetermined time in a time period of reading out the image signal, to the TG 1301 (cyclic setting).

Next, in step S1502, the CPU 1303 sets a read-out area (range of columns) in the horizontal direction to the horizontal selection circuit 1300c.

The image signal is read out in a unit of each row of the pixel array. In this embodiment, on readout of the image signal, the image A signal, column areas of which are set in the horizontal direction, is read out and subsequently the image A+B signal is read out. Here, setting on the VOB area of the image A signal is performed. The read-out area of the image A+B is the entire open pixel area.

Figure 16A:
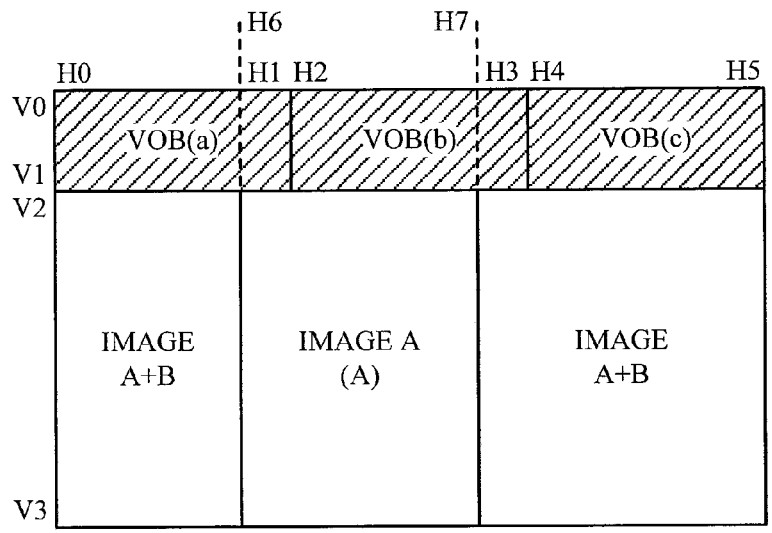
FIGS. 16A and 16B are diagrams conceptually illustrating the arrangement of a read-out area of the image pickup element according to the second embodiment of the present invention.

FIG. 16A is a diagram conceptually illustrating the pixel arrangement configuration of the pixel array 1300a and the arrangement of the read-out area. Areas defined by the range H0 to H5 in the horizontal direction and the range V0 to V1 in the vertical direction is a VOB areas and divided into (set as) three areas VOB(a), VOB(b) and VOB(c).

As described above, the image pickup element 1300 can select a read-out range of columns in the pixel array 1300a, and in step S1502 the CPU 1303 sets the image pickup element 1300 such that the read-out range of columns of the image A signal relating to the VOB area is VOB(a). More specifically, the VOB(a) cyclic area of the image A signal and the VOB(a), VOB(b) and VOB(c) cyclic areas of the image A+B signal are set.

Subsequently, in step S1503, the CPU 1303 causes the image pickup element 1300 to start an operation of reading out an image signal. On readout, the OB pixel selection pulse is at the high level for a predetermined time period, thereby repeatedly reading out the areas V0 and V1 in the vertical direction (cycle operation). As a result, the read-out image 1710 includes the VOB(a) cyclic area of the image A signal and the VOB(a), VOB(b) and VOB(c) cyclic areas of the image A+B signal as illustrated in FIG. 17.

Figure 17:
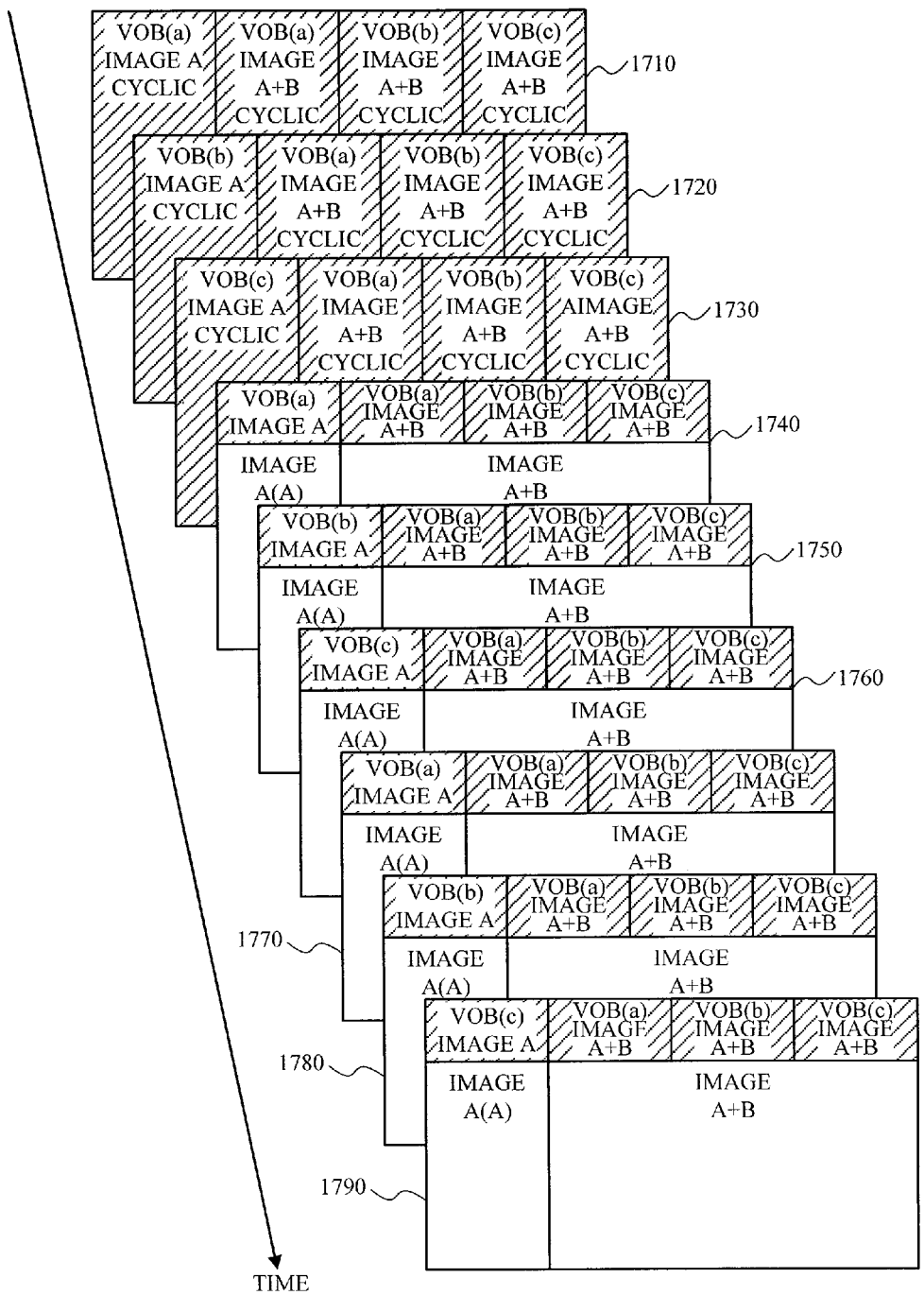
FIG. 17 is a diagram conceptually illustrating a read-out area from the image pickup element according to the second embodiment of the present invention.

The images 1710 to 1790 in FIG. 17 correspond to after-mentioned FIGS. 18A to 18I and to FIGS. 19A to 19I.

The image is converted into a digital signal by the AFE 1302 and subsequently input into the image correction unit 300. In the image correction unit 300, the image data is input into the correction data generation circuit 304, and a correction data is generated on the each column basis of the pixel array on the basis of a predetermined process.

Figure 18A:
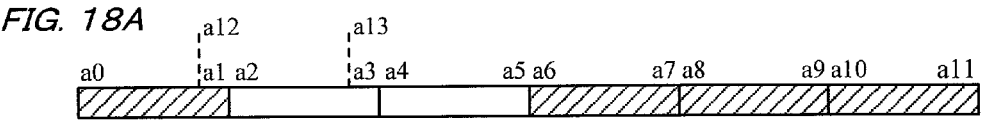

FIG. 18A is a diagram schematically illustrating the addresses of the memory 301 accessed when the correction data is generated. The generated correction data of the image A data on the columns H0 to H1, which is the generated VOB(a) area, is stored in the addresses a0 to a1. The correction data of the image A+B data on columns H0 to H5, which are VOB(a), VOB(b) and VOB(c) areas are stored in the addresses a6 to a11.

Next, in step S1504, the CPU 1303 determines whether correction data generation is finished or not. At this time, generation of the correction data of the image A data on the columns H0 to H1 of the image pickup element 1300 is finished, but the correction data of the image A data on the columns H2 to H5 is not generated. Accordingly, the processing returns to step S1502.

In step S1502, the CPU 1303 sets, to VOB(b), the range of column from which the image A signal pertaining to the VOB area is read out, in the image pickup element 1300. More specifically, the VOB(b) cyclic area of the image A signal and the VOB(a), VOB(b) and VOB(c) cyclic areas of the image A+B signal are set.

Subsequently, in step S1503, the CPU 1303 causes the image pickup element 1300 to start an operation of reading out the image data. On readout, the OB pixel selection pulse is at the high level in a predetermined time period, and the areas V0 to V1 in the vertical direction is repeatedly read out (cycle operation). As a result, the read out image signal includes an image signal 1720 read out from the VOB(b) cyclic area of the image A signal and the VOB(a), VOB(b) and VOB(c) cyclic areas of the image A+B signal as illustrated in FIG. 17.

The image is converted into a digital signal by the AFE 1302 and subsequently input into the image correction unit 300. In the image correction unit 300, the image data is input into the correction data generation circuit 304, and the correction data is generated based on a predetermined process.

Figure 18B:
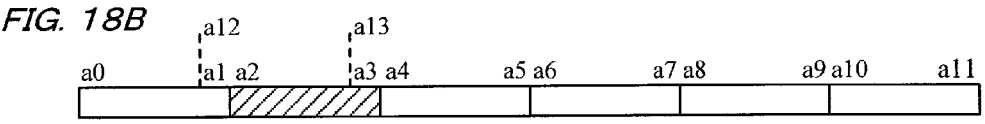
Figure 18C:
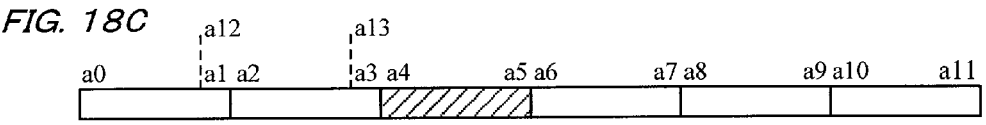

FIG. 18B is a diagram schematically illustrating memory addresses accessed in correction value generation. The correction data of the image A data on the columns H2 to H3, which is the generated VOB(b) area, is stored in the addresses a2 to a3. Here, the correction data of the image A+B data on H0 to H5 is already generated. Accordingly, no correction data is generated and stored.

Next, in step S1504, the CPU 1303 determines whether the correction data generation is finished or not. At this time, correction data generation of the image A signal on the columns H0 to H3 of the pixel array 1300a is finished, but the correction data of the image A signal on the columns H4 to H5 is not generated. Accordingly, the processing returns to step S1502.

Subsequently, as with the above operation, the correction data on the columns H4 to H5 in the VOB(c) area is generated and stored in the memory addresses a4 to a5.

Subsequently, in step S1504, it is determined that generation of the correction data on all the columns is finished. The processing proceeds to step S1505.

In step S1505, the CPU 1303 performs setting for causing the OB pixel selection pulse to be at the low level for a predetermined time in the read-out time period, to the TG 1301 (non-cyclic setting).

Next, in step S1506, a read-out pixel range from which the image A signal is read out is selected from among pixels that are not light-shielded (open pixels). As described above, in this embodiment, the area (AF area) on which auto focus is performed is designated in advance according to the operation on the operation unit 1304 by the user. Based on the designation, the CPU 1303 performs setting of an area from which the image A signal defined by the column range H6 to H7 and the row range V2 to V3 illustrated in FIG. 16A is read out, to the image pickup element 1300.

Subsequently, in step S1507, the CPU 1303 sets, in the image pickup element 1300, the read-out range of columns of the image A signal pertaining to the VOB area to VOB(a). The setting is for updating the correction data of the image A signal stored in the memory.

In addition to those settings, the VOB(a), VOB(b) and VOB(c) areas of the image A+B signal, and the image A+B area, which is the open area of the image A+B signal, are set for the image A+B.

After the setting, in step S1508, the CPU 1303 causes the image pickup element 1300 to start the read-out operation.

The read out image signal includes an image signal 1740 read out from each area set as illustrated in FIG. 17. That is, the signal includes the image signal read out from the VOB(a) area of the image A data, the VOB(a), VOB(b) and VOB(c) areas of the image A+B data, the A image (A) area as the open pixel area of the image A data, and the image A+B area as the open area of the image A+B data.

Figure 18D:
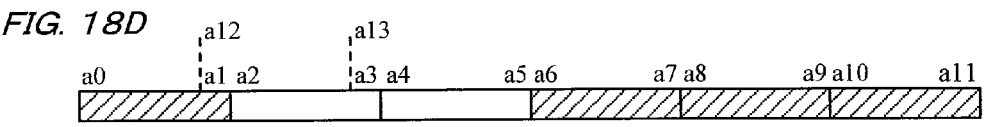

The image is converted into a digital signal by the AFE 1302 and subsequently input into the image correction unit 300. In the image correction unit 300, the image A data in the VOB(a) area is input into the correction data update circuit 305, and the correction data is updated based on a predetermined process. FIG. 18D schematically illustrates memory addresses accessed on updating. When the correction data of the image A data is updated, the correction data stored in the addresses a0 to a1 is output from the memory 301, the correction data is updated and subsequently stored in the addresses a0 to a1 again. When the correction data of the image A+B data is updated, the correction data stored in the addresses a6 to a11 is output from the memory 301, the correction data is updated and subsequently stored in the addresses a6 to a11 again.

Figure 19A:
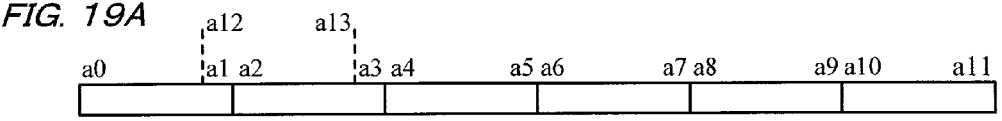
FIGS. 19A, 19B, 19C, 19D, 19E, 19F, 19G, 19H and 19I are diagrams schematically illustrating memory access in reading the correction data by the image correction unit according to the second embodiment of the present invention.
Figure 19B:
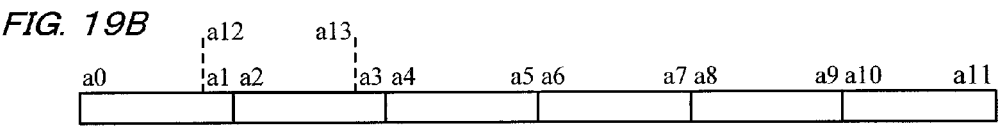
Figure 19C:
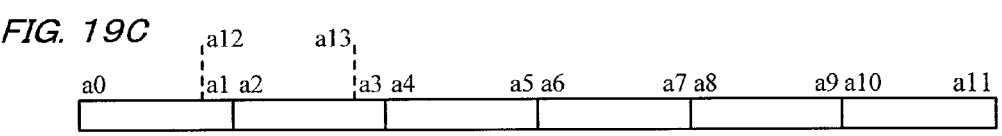
Figure 19D:
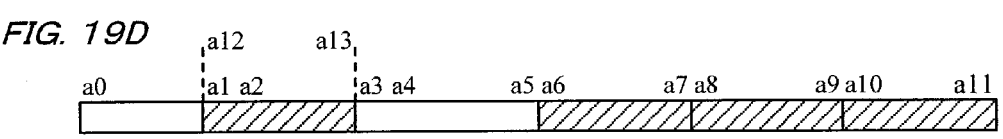

The image data in the A image (A) area as the open pixel area is corrected on the each column basis on the basis of the correction data updated as described above. FIG. 19D schematically illustrates memory addresses to be accessed on correction. The correction data stored in the addresses a12 to a13 is output from the memory 301. The image data in the A image (A) area as the open pixel area is corrected on the each column basis. The address a12 corresponds to the column H6 of the image pickup element 1300. The address a13 corresponds to the column H7. The number of correction data of the addresses a12 to a13 is the same as the number of columns in the range H6 to H7.

The image data in the image A+B area as the open pixel area is corrected on the each column basis based on the correction data updated as described above. The correction data stored in the addresses a6 to a11 illustrated in FIG. 19D is output from the memory 301. The image data in the image A+B area as the open pixel area is corrected on the each column basis. The address a6 corresponds to the column H0 of the pixel array 1300a. The address a11 corresponds to the column H5. The number of correction data in the addresses a6 to a11 is the same as the number of columns in the range H0 to H5.

According to the above operation, in one readout (one frame), after the correction data of the image signal in the VOB area is updated, the image data can be corrected.

Next, in step S1509, the AF operation is performed.

The corrected image data is input into the AF calculator 1310. The image B data is generated from the image A data and the image A+B data. A predetermined operation is performed to the image A data and the image B data to calculate the defocus amount. The AF calculator 1310 outputs the calculated defocus amount to the focus drive unit 1312. The focus drive unit 1312 calculates the movement amount of the third lens group 1316 on the basis of the defocus amount obtained from the AF calculator 1310, and outputs a drive command to the focus actuator 1314. The third lens group 1316 is moved by the focus actuator 1314 to the in-focus position to achieve an in-focus state in the photographing optical system of the image pickup element 1300.

Next, in step S1510, the CPU 1303 determines that photographing is finished or not. If not finished, the processing proceeds to step S1511. In step S1511, it is determined whether the AF area is changed by the user or not. If the AF area is not changed, the processing returns to step S1507.

Next, in step S1507, the CPU 1303 sets, in the image pickup element 1300, the column from which the image A data relating to the VOB area is read out, to the VOB(b). The setting is for updating the correction data of the image A signal stored in the memory sequentially from the previous frame.

In addition to the setting, the VOB(a), VOB(b) and VOB(c) areas of the image A+B signal, and the image A+B area as the open area of the image A+B signal are set for the image A+B.

After the setting, in step S1508, the CPU 1303 causes the image pickup element 1300 to start a read-out operation.

As illustrated in FIG. 17, the read-out image signal includes an image signal 1750 read out from each of the set areas. That is, the signal includes image signals read out from the VOB(b) area of the image A data, the VOB(a), VOB(b) and VOB(c) areas of the image A+B data, the A image (A) area as the open pixel area of the image A data, and the image A+B area as the open area of the image A+B data.

Figure 18E:
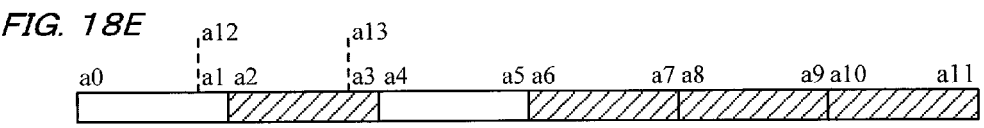
Figure 18F:
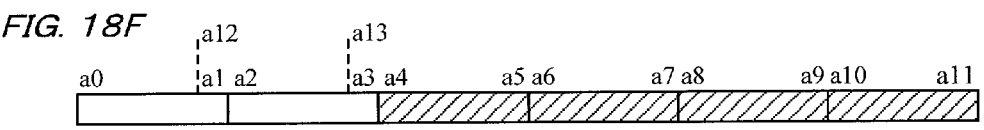
Figure 18G:
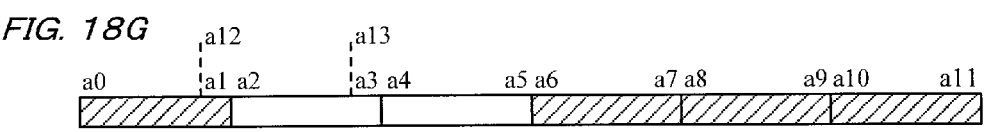
Figure 18H:
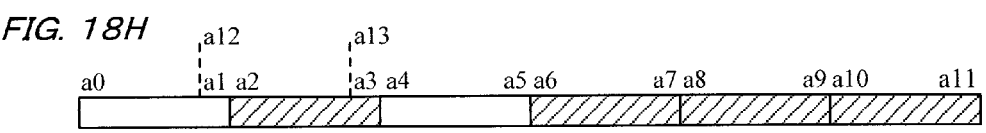
Figure 18I:
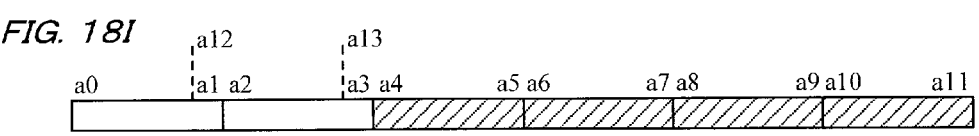

The image signal is converted into a digital signal by the AFE 1302 and subsequently input into the image correction unit 300. In the image correction unit 300, the image A data in the VOB(b) area is input into the correction data update circuit 305, and the correction data is updated based on a predetermined process. FIG. 18E illustrates memory addresses accessed in updating. When the correction data of the image A data is updated, the correction data stored in the addresses a2 to a3 is output from the memory 301, the correction data is updated and subsequently stored in the addresses a2 to a3 again. When the correction data of the image A+B data is updated, the correction data stored in the addresses a6 to all is output from the memory 301, the correction data is updated and subsequently stored in the addresses a6 to all again.

Figure 19E:
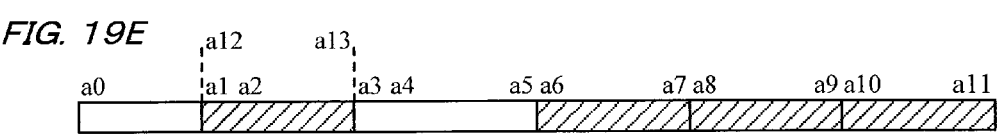

The image data in the A image (A) area as the open pixel area is corrected on the each column basis on the basis of the correction data updated as described above. FIG. 19E illustrates memory addresses to be accessed in correction. The correction data stored in the addresses a12 to a13 is output from the memory 301, and used for correcting the image data of the A image (A) area as the open pixel area on the each column basis.

The image data in the image A+B area as the open pixel area is corrected on the each column basis based on the correction data updated as described above. The correction data stored in the addresses a6 to all illustrated in FIG. 19D is output from the memory 301, and the image data in the image A+B area as the open pixel area is corrected on the each column basis.

Subsequently, in step S1509, an AF operation is performed as with the operation described above.

Figure 19F:
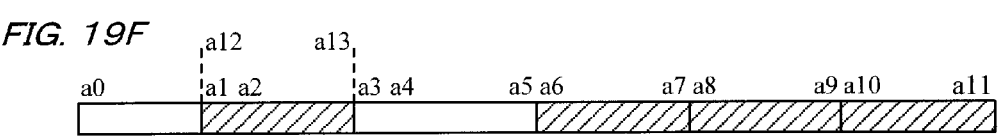
Figure 19G:
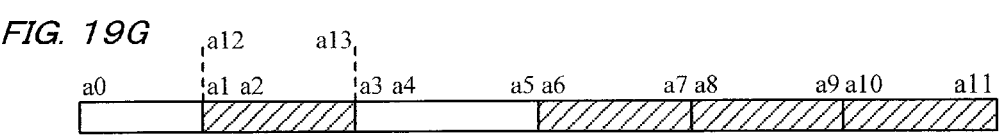
Figure 19H:
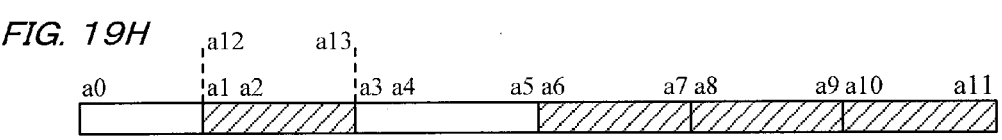
Figure 19I:
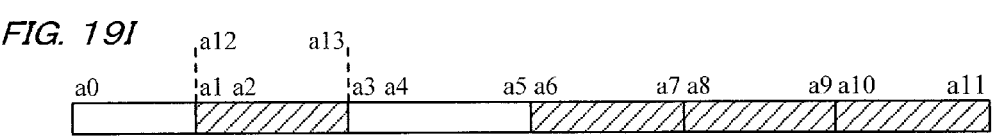

Likewise, the VOB(c) is selected as the column from which the image A data pertaining to the VOB area is read out, and read out in a manner of an image 1760 illustrated in FIG. 17, and the correction data is updated (FIG. 18F) and the image data is corrected (FIG. 19F). Subsequently, the AF operation is performed.

Until the AF area is changed by the user, the readout is repeated in the manners of images 1760 to 1790 illustrated in FIG. 17, thereby sequentially performing updating of the correction data, correction of the image data, and the AF operation.

Figure 16B:
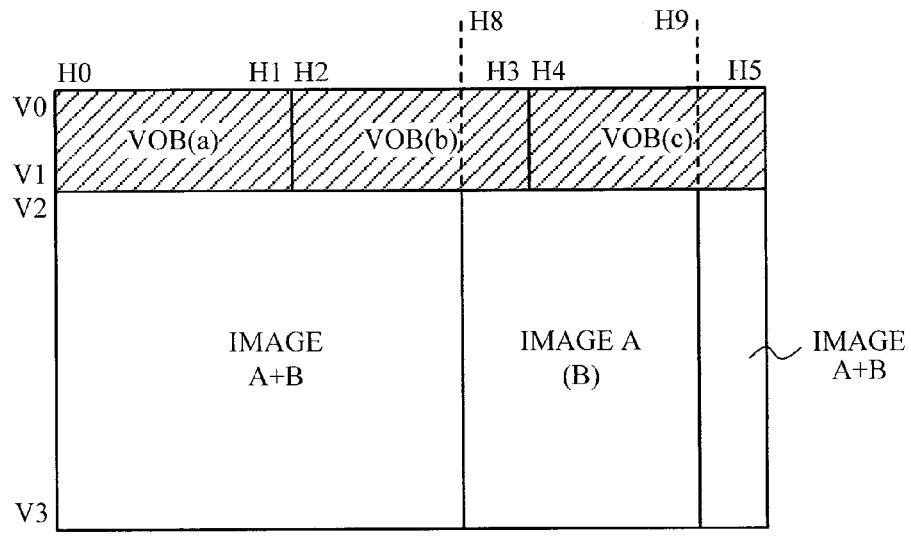

If in step S1511 it is determined that the AF area is changed, the processing returns to step S1506, the CPU 1303 resets the open pixel area of the image A data to be read out, in the image pickup element 1300. FIG. 16B illustrates the changed AF area. It is provided that the AF area ranges from H8 to H9 in the horizontal direction and from V2 to V3 in the vertical direction.

Figure 20:
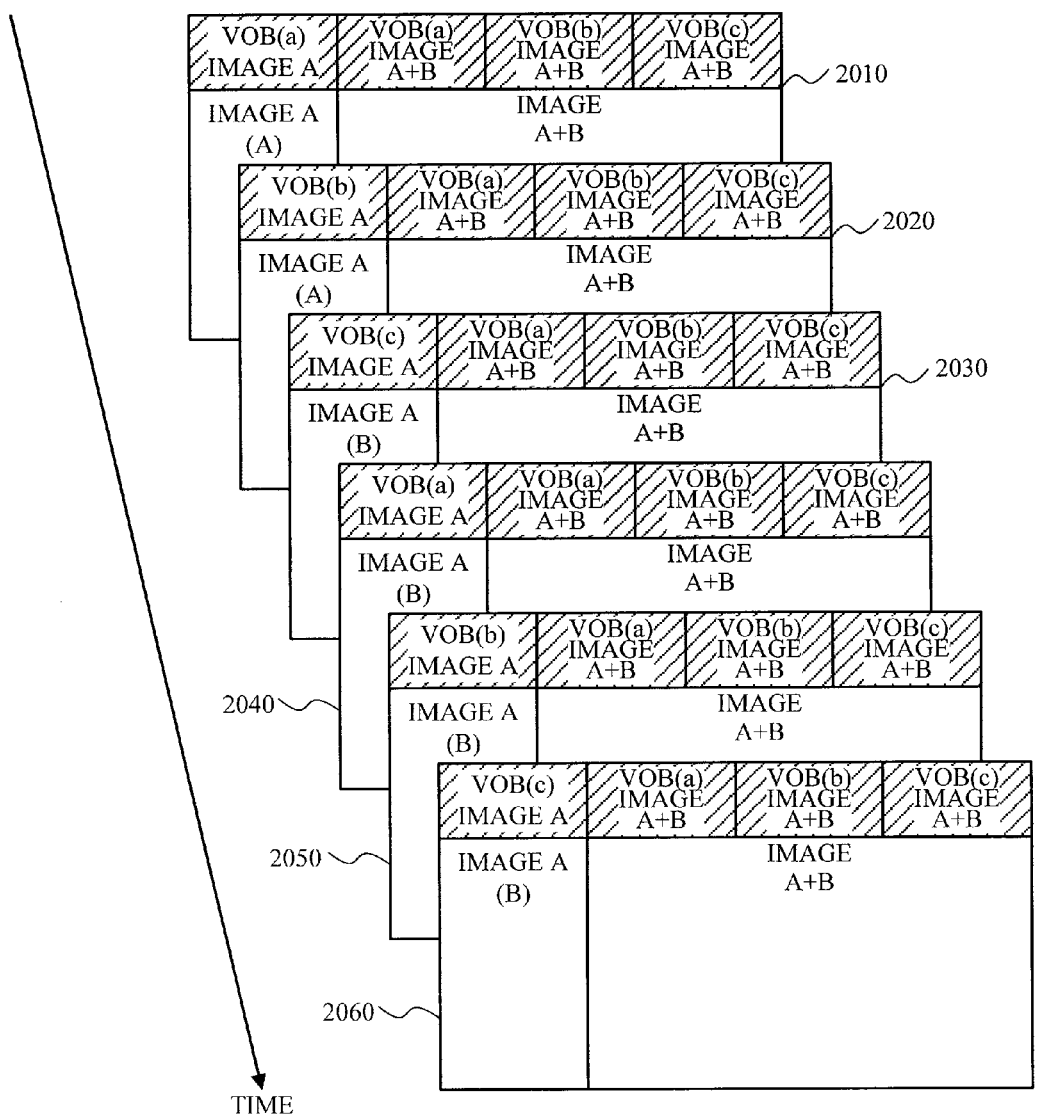
FIG. 20 is a diagram conceptually illustrating a read-out area from the image pickup element according to the second embodiment of the present invention.

It is assumed that, at the time 2030 illustrated in FIG. 20, in step S1511, the AF area is changed. The operation described above is repeated therebefore. The images 2010 to 2060 illustrated in FIG. 20 correspond to after-mentioned FIGS. 21A to 21F and to FIGS. 22A to 22F.

Subsequently, in step S1507, the CPU 1303 sets, in the image pickup element 1300, the column from which the image A data pertaining to the VOB area is read out, to VOB(c). The setting is for updating the correction data in the next VOB(c) after the correction data in the VOB(b) is updated in readout of the previous frame.

In addition to those settings, the VOB(a), VOB(b) and VOB(c) areas of the image A+B signal, and the image A+B area as the open area of the image A+B signal are set for the image A+B.

After the setting, in step S1508, the CPU 1303 causes the image pickup element 1300 to start the read-out operation.

As illustrated in FIG. 20, the read-out image signal includes an image signal 2030 read out from each area set as described above. That is, the VOB(c) area of the image A data, the VOB(a), VOB(b) and VOB(c) areas of the image A+B data, the A image (B) area as the open pixel area of the image A data, and the image A+B area as the open area of the image A+B data.

Figure 21A:
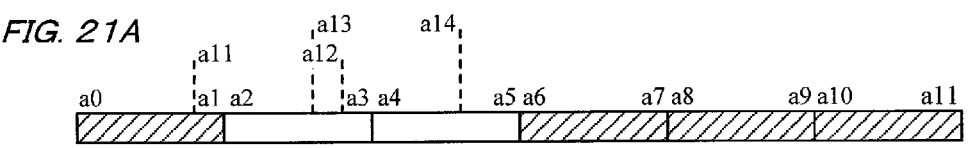
FIGS. 21A, 22B, 22C, 22D, 22E and 21F are diagrams schematically illustrating memory access in storing the correction data by the image correction unit according to the second embodiment of the present invention.
Figure 21B:
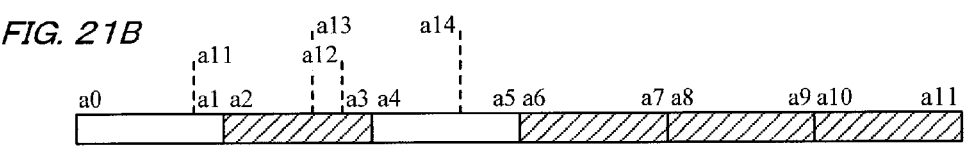
Figure 21C:
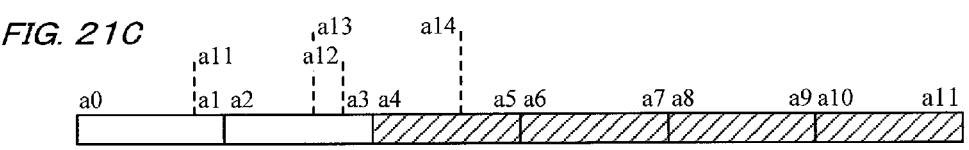
Figure 21D:
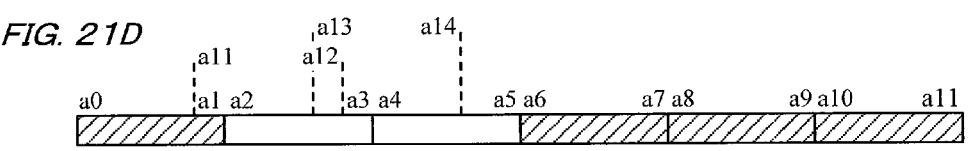
Figure 21E:
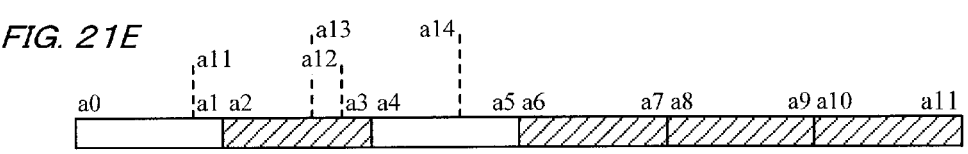
Figure 21F:
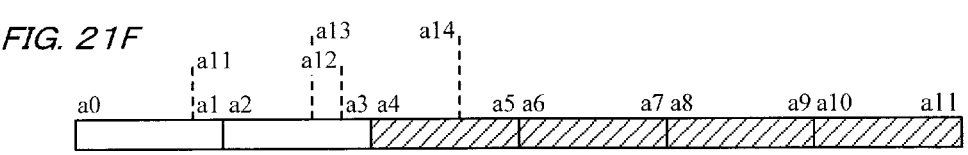

The image signal is converted into a digital signal by the AFE 1302 and subsequently input into the image correction unit 300. In the image correction unit 300, the image A data in the VOB(c) area is input into the correction data update circuit 305, and the correction data is updated based on a predetermined process. FIG. 21C illustrates memory addresses to be accessed in updating. When the correction data of the image A data is updated, the correction data stored in the addresses a4 to a5 is output from the memory 301, the correction data is updated and subsequently stored in the addresses a4 to a5 again. When the correction data of the image A+B data is updated, the correction data stored in the addresses a6 to all is output from the memory 301, the correction data is updated and subsequently stored in the addresses a6 to all again.

Figure 22A:
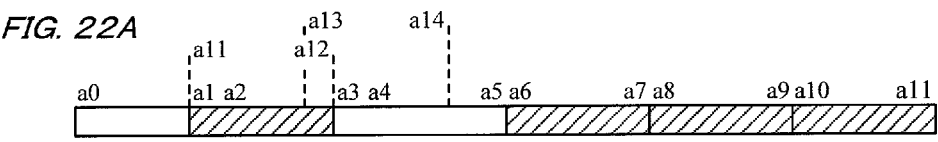
Figure 22B:
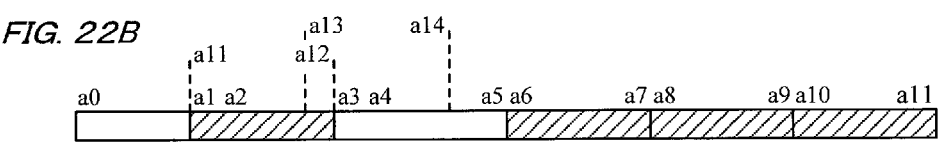
Figure 22C:
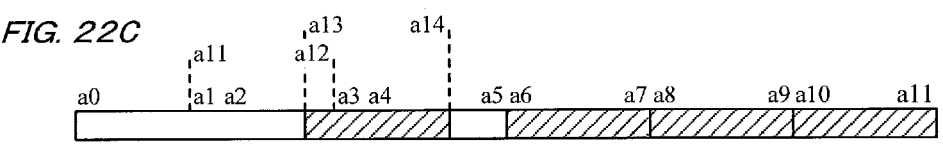
Figure 22D:
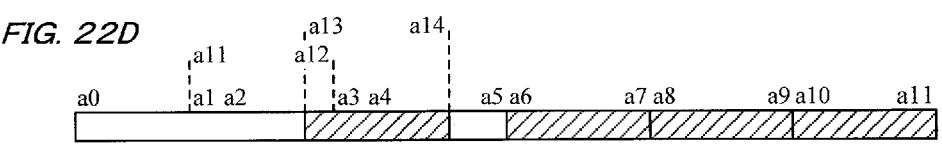
Figure 22E:
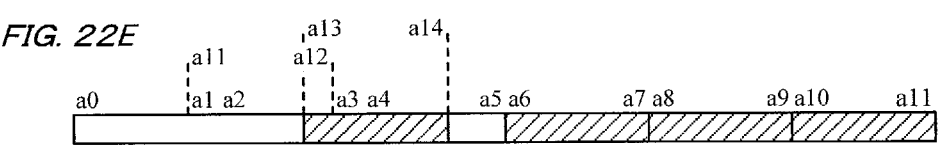
Figure 22F:
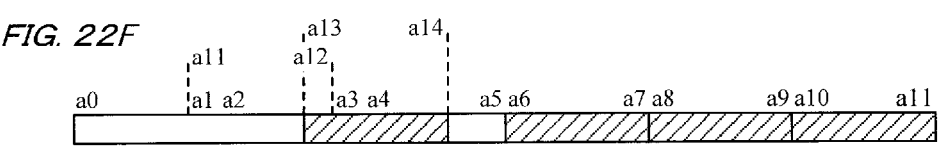

The image data of the A image (B) area as the open pixel area is corrected on the each column basis based the basis of the correction data updated as described above. FIG. 22C illustrates memory addresses to be accessed in correction. The correction data stored in the addresses a13 to a14 is output from the memory 301, and the image data in the A image (B) area as the open pixel area is corrected on the each column basis. The address a13 corresponds to the column H8 of the pixel array 1300a. The address a14 corresponds to the column H9. The number of the correction data in the addresses a13 to a14 is the same as the number of columns in the range H8 to H9.

The image in the image A+B area as the open pixel area is corrected on the each column basis based on the correction data updated as described above. The correction data stored in the addresses a6 to all illustrated in FIG. 22C is output from the memory 301, and the image data in the image A+B area as the open pixel area is corrected on the each column basis.

Subsequently, the AF operation is performed in step S1509, subsequently processes step S1510 and S1511 are performed and then readout of the frame in the case where the AF area is not changed, is repeated (images 2040 to 2060 in FIG. 20).

The image data (image A+B data) in each of the read-out frames is stored in the RAM 1307, subsequently compressed by the image processing unit 1308, and recorded as a moving image in the recording unit 1309.

As described above, the VOB area of the image A signal read out in readout of the frame is sequentially changed from VOB(a) to VOB(b) to VOB(c). The correction data is generated and updated using the image signal read out from each VOB area, and stored in the memory addresses corresponding to the respective areas. Accordingly, the correction data of the image A data of all the columns of the pixel array 1300a of the image pickup element 1300 can be always held. When the image data is corrected, correction on the each column basis can be performed by accessing the memory address corresponding to the column in the pixel array of the image data to be corrected.

Even when the AF area is changed, correction can be performed using the correction data corresponding to the image data of the column in the pixel array only by accessing the memory address corresponding to each pixel column of the changed image A data. Accordingly, the frame of the image data due to regeneration of the correction data can be prevented from being eliminated. After the AF area is changed, the AF operation can be performed immediately thereafter using the corrected image data without interrupting the AF operation in each frame.

Third Embodiment

In this embodiment, an image pickup apparatus has the configuration which can set and change a read-out mode of an image signal and in which a correction data update circuit of an image correction unit applies a gain to an update amount and changes the gain according to the update situations. The block configuration of the image pickup apparatus according to this embodiment is analogous to that of the image pickup apparatus of the second embodiment. Accordingly, the description thereof is omitted here. The operations are analogous to those of the second embodiment except for those relating to the gain setting and the change of the read-out mode. Accordingly, the description is omitted but appropriate notes are added.

First, the image correction unit 300 according to this embodiment will be described.

Figure 23:
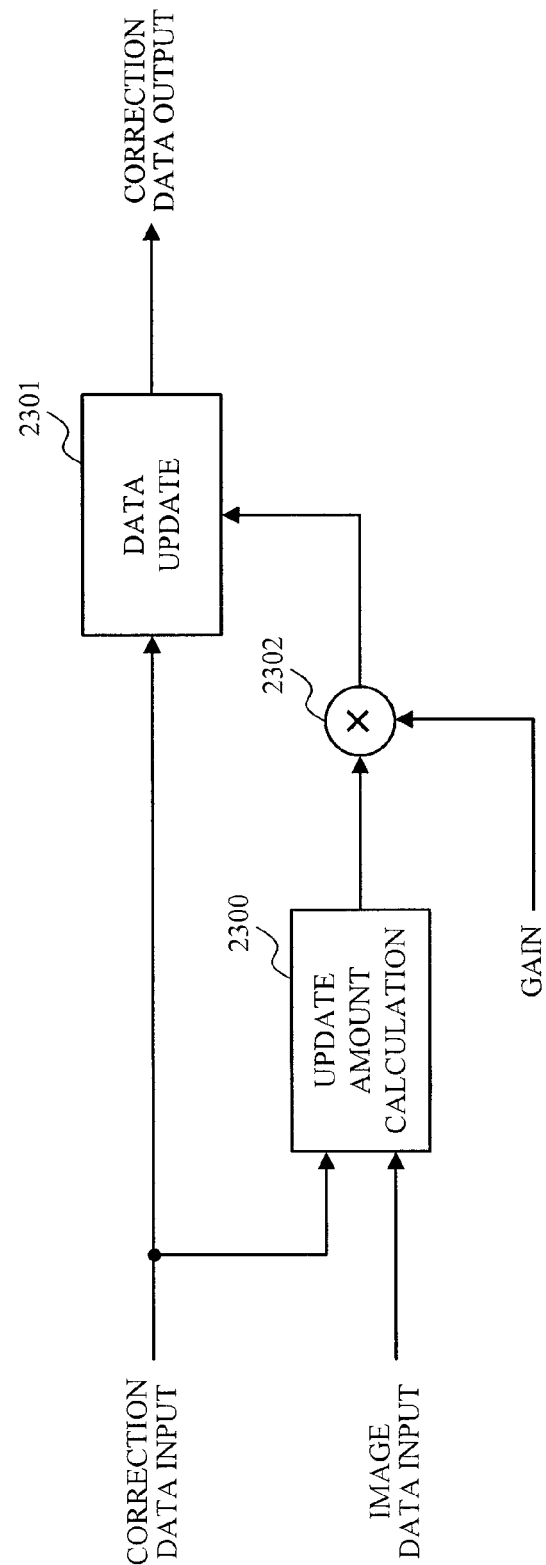
FIG. 23 is a block diagram illustrating a configuration of a correction data update circuit of an image correction unit according to a third embodiment of the present invention.

FIG. 23 is a block diagram illustrating the configuration of a correction data update circuit 305 in an image correction unit 300 of this embodiment. In this diagram, a correction data stored in a memory 301 and an image data are input into an update amount calculation circuit 2300, which calculates the update amount of the correction data from the input data. The update amount is input into a multiplier 2302. A gain set in the multiplier is applied to the update amount. A calculation result is input into a data update circuit 2301. The data update circuit 2301 calculates a new correction data from the input correction data and the calculation result, and outputs the new correction data. The value of the gain input into the multiplier is set by the CPU 1303.

The image pickup element 1300 according to this embodiment has a function of adding pixels in the horizontal direction in a read-out mode. After setting of adding horizontal three pixels is performed by the CPU 1303, signals in the adjacent three pixels are added and output. For instance, an addition read-out mode corresponds to a state where a user operates the operation unit 1304 to set a moving image displayed on the display unit 1306 to that illustrated in FIG. 26A. A non-addition read-out mode corresponds to a case where enlargement display setting as illustrated in FIG. 26B is performed.

Figure 24:
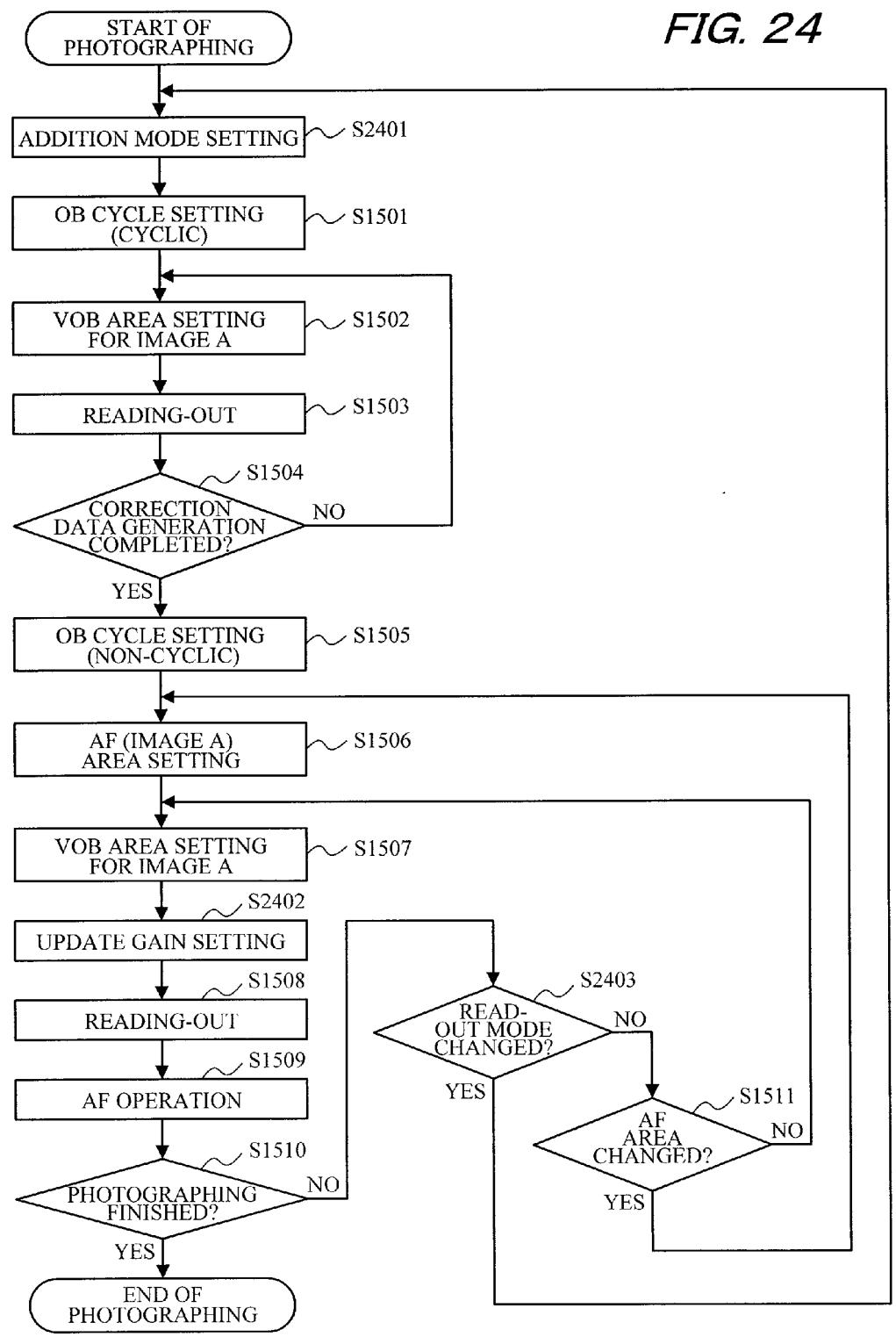
FIG. 24 is a diagram illustrating a flowchart of an operation of the image pickup apparatus according to the third embodiment of the present invention.

FIG. 24 illustrates a flowchart of an operation of an image pickup apparatus according to this embodiment. In this diagram, processing steps analogous to those in FIG. 15 are assigned with the identical symbols.

Hereinafter, referring to FIG. 24, the operation of the image pickup apparatus according to this embodiment will be described.

After an operation on the operation unit 1304 starts photographing of a moving image, in step S2401 the CPU 1303 performs setting of the addition mode in the image pickup element 1300. Here, the mode is set to the three-horizontal-pixel addition mode.

Next, the correction data is generated. The processes until it is determined that the correction data generation is finished in steps S1501 to 1504 are analogous to those of the second embodiment. Accordingly, the detailed description is omitted here.

Figure 25A:
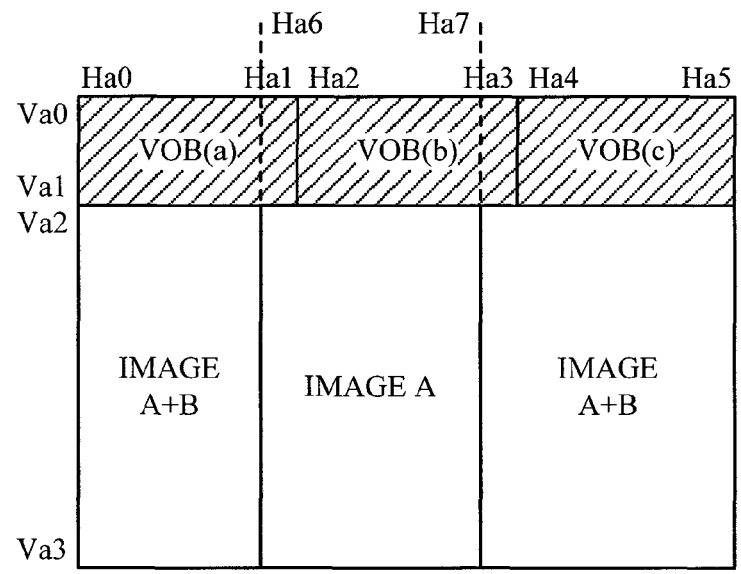
FIGS. 25A and 25B are diagrams conceptually illustrating the arrangement of a read-out area from an image pickup element according to the third embodiment of the present invention.

FIG. 25A illustrates the read-out area in the pixel array in the three-horizontal-pixel addition read-out mode. Areas defined by the range in the horizontal direction (range of columns) Ha0 to Ha5 and the range in the vertical direction (range of rows) Va0 to Va1 are VOB areas, which are divided into three areas VOB(a), VOB(b) and VOB(c).

Next, setting for reading out the image signal is performed. The area setting in steps S1505 to S1507 is analogous to those in the second embodiment. Accordingly, the description is omitted. The read-out area set here is the VOB(a), VOB(b) and VOB(c) areas of the image A+B data, and the image A+B area as the open area of the image A+B data, in addition to the VOB(a) area of the image A data, and the open pixel area of the image A data.

After those area settings, in this embodiment, the CPU 1303 sets the update gain in step S2402. If the correction data is generated and stored in the memory 301 by the previous operation, a gain A value is set to reduce the effect exerted to the correction data even with miscalculation of the update amount affected by noise.

After setting, in step S1508 the CPU 1303 causes the image pickup element 1300 to start the read-out operation.

The read-out image signal includes signals read out from the VOB(a) area of the image A data, the VOB(a), VOB(b) and VOB(c) areas of the image A+B data, the A image area as the open pixel area of the image A data, and the image A+B area as the open area of the image A+B data. Update of the correction data and correction of the image data here are analogous to those in the second embodiment. Accordingly, the description is omitted.

The operation in step S1508 can update the correction data in the VOB area and subsequently correct the image data in one readout (one frame).

Next, in step S1509, an AF operation is performed. The operation is analogous to that in the second embodiment. Accordingly, the description is omitted here.

Next, in step S1510, the CPU 1303 determines whether photographing is finished or not. If not finished, the processing proceeds to step S2403. In step S2403, it is determined whether an after-mentioned read-out mode is changed by the user or not. Here, it is assumed that the read-out mode is not changed, and the processing proceeds to step S1511.

In step S1511, it is determined whether the AF area is changed or not. If the AF area has not been changed, the processing returns to step S1507.

As with the second embodiment, in the operations from and after the subsequent step S1507, the column from which the image A data pertaining to the VOB area is read out is changed on each frame, and analogously the operation in steps S1507 to S1511 is repeated.

Each read-out frame image (image A+B data) is stored in the RAM 1307, subsequently compressed by the image processing unit 1308, and stored as a moving image in the recording unit 1309.

Next, a case where the read-out mode is changed in step S2403 will be described.

Figure 26:
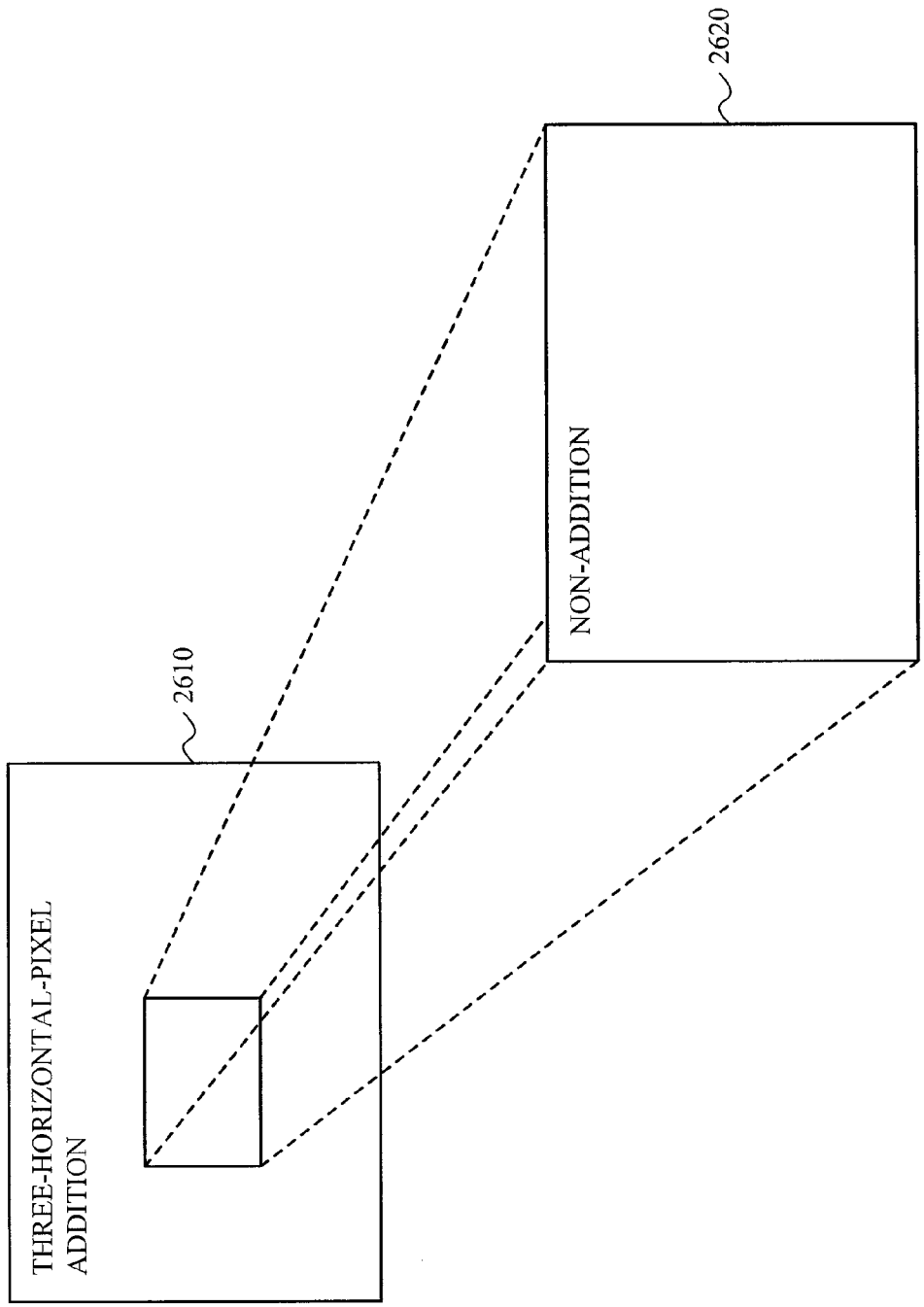
FIG. 26 is a diagram conceptually illustrating a mode change operation of the image pickup apparatus according to the third embodiment of the present invention.

It is assumed that the user operates the operation unit 1304 to change the moving image displayed on the display unit 1306 from a state 2610 in FIG. 26 to a state 2620 in FIG. 26, where enlarged display setting is performed. Since the display setting is changed, in step S2403 the CPU 1303 determines that the read-out mode is changed, and advances the processing to step S2401.

In step S2401, the CPU 1303 performs setting of a non-addition mode in the image pickup element 1300 according to setting 2620 of enlarged display illustrated in FIG. 26.

Setting operations in next steps S1501 and S1502 are analogous to those in the second embodiment. Accordingly, the description is omitted here.

Figure 25B:
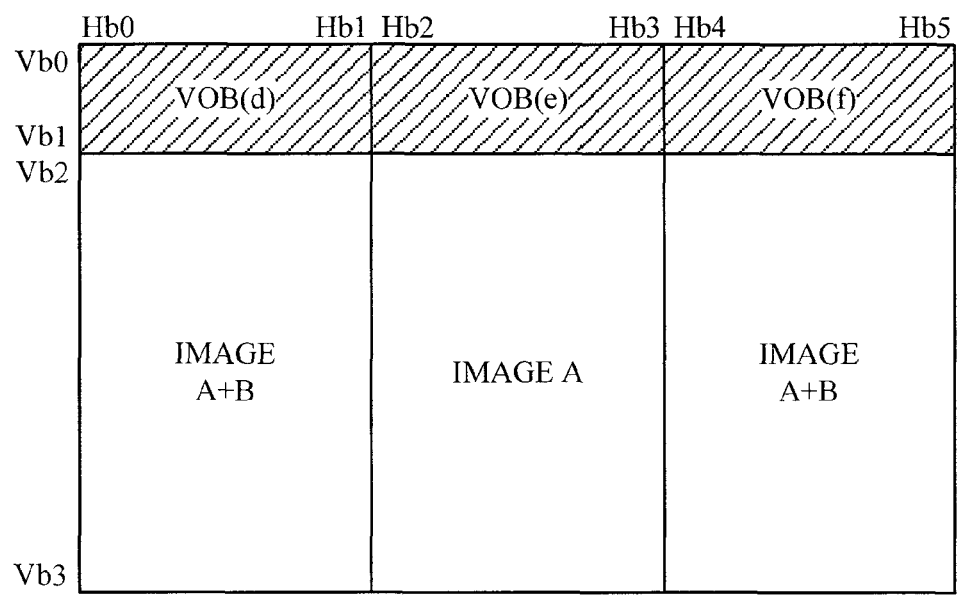

FIG. 25B illustrates the read-out area of the pixel array in the non-addition read-out mode. As illustrated in this diagram, areas defined by the range in the horizontal direction (range of columns) Hb0 to Hb5 and the range in the vertical direction (range of rows) Vb0 to Vb1 are VOB areas, which are divided into three areas VOB(e), VOB(d) and VOB(f).

Figure 27:
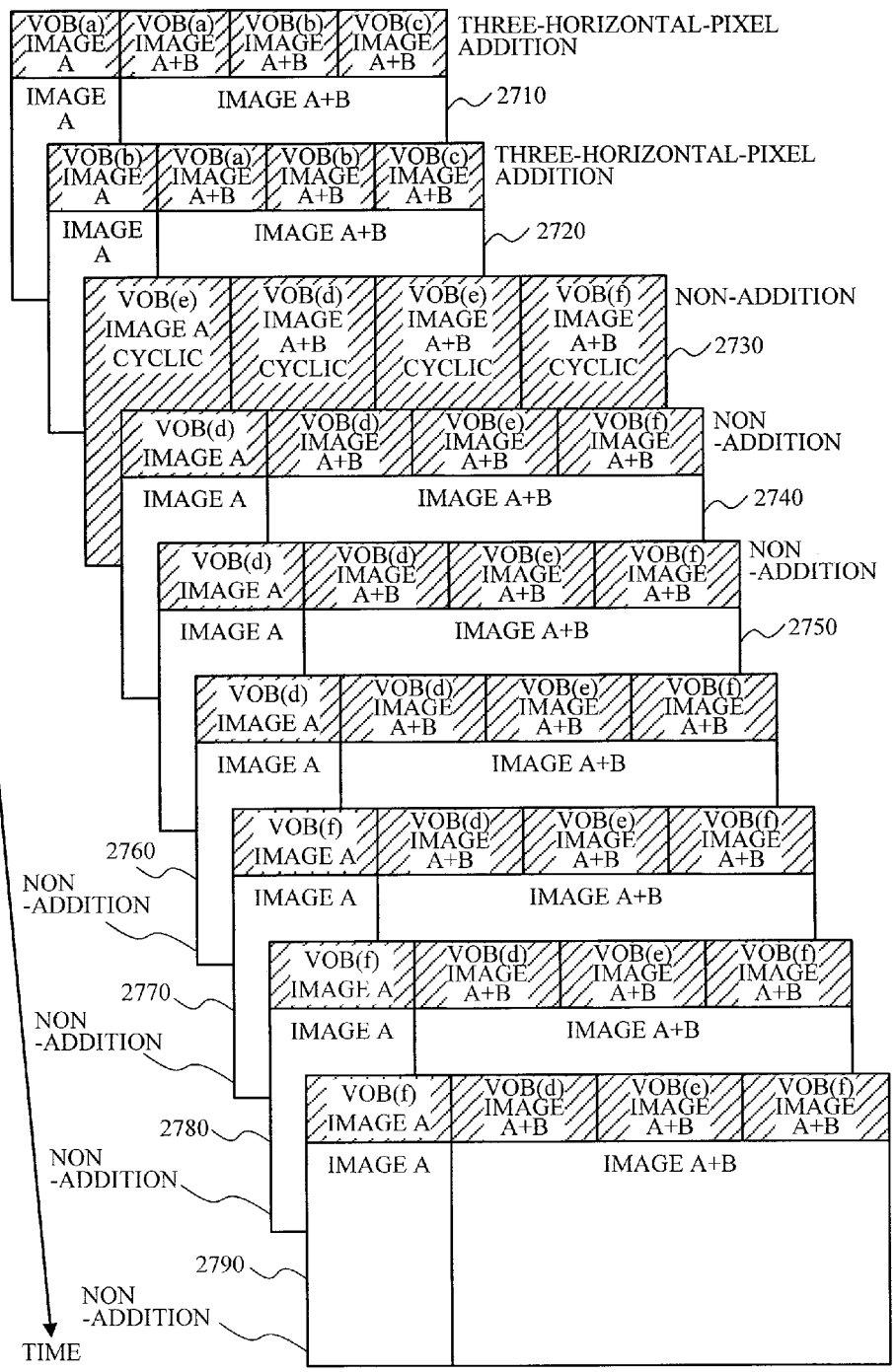
FIG. 27 is a diagram conceptually illustrating a read-out area from the image pickup element according to the third embodiment of the present invention.

At time 2730 illustrated in FIG. 27, it is assumed that the read-out mode is changed in step S2403. The operations described above are repeated before this operation. The images 2710 to 2790 in FIG. 27 correspond after-mentioned FIGS. 28A to 28F and to FIGS. 29A to 29F.

As described in the second embodiment, the image pickup element 1300 can select the read-out column in the horizontal direction. In step S1502, the CPU 1303 sets, in the VOB(e), the column from which the image A data pertaining to the VOB area, to the image pickup element 1300.

The VOB(e) area is herein set for using the image A data area of the open pixels illustrated in FIG. 25B as the AF area of the open pixels immediately after the read-out mode is changed. In the case of using other area as the initial AF area immediately after the read-out mode is changed, the VOB area on the same column as that of the image A data of the read-out open pixels may be set.

Subsequently, in step S1503, the CPU 1303 starts the operation of reading out the image signal from the image pickup element 1300. On readout, the OB pixel selection pulse is at the high level for a predetermined time period, and the area in the range Vb0 to Vb1 in the vertical direction is repeatedly read out (cycle operation). As a result, as illustrated in FIG. 27, the read-out image signal includes an image signal 2730 read out from the VOB(e) cyclic area of the image A data, and the VOB(d), VOB(e) and VOB(f) cyclic areas of the image A+B data.

The image signal is converted into a digital signal by the AFE 1302 and subsequently input into the image correction unit 300. In the image correction unit 300, the image data is input into the correction data generation circuit 304. To newly generate a correction data, the memory 301 is reset and subsequently the correction data is generated based on a predetermined process.

Figure 28A:
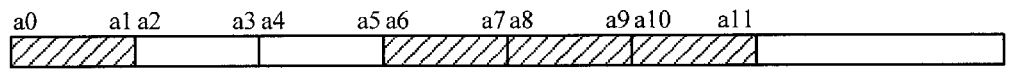
FIGS. 28A, 28B, 28C, 28D, 28E, 28F, 28G, 28H and 28I are diagrams schematically illustrating memory access in storing a correction data by an image correction unit according to the third embodiment of the present invention.
Figure 28B:
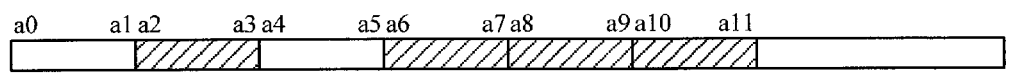
Figure 28C:
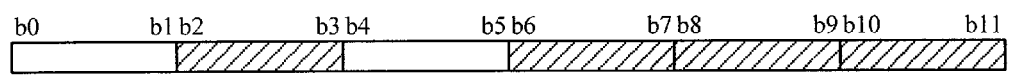

As illustrated in FIG. 28C, the generated correction data of the image A data on the columns Hb2 to Hb3 in the VOB(e) area is stored in the memory addresses b2 to b3. The correction data of the image A+B data on Hb0 to Hb5 in the VOB(d), VOB(e) and VOB(f) areas are stored in the addresses b6 to b11.

Next, in step S1504, the CPU 1303 determines whether the correction data generation is finished or not. At this time, the correction data on columns Hb2 to Hb3 in the AF area is generated. The processing proceeds to step S1505.

In step S1506, the CPU 1303 performs setting of causing the OB pixel selection pulse to be at the low level for a predetermined time in a read-out time period, to the TG 1301 (non-cyclic setting).

Next, in step S1506, an area from which the image A data is read out is selected from among pixels that are not light-shielded (open pixels). As described above, setting is herein performed to allow readout of the image A signal in the area defined by the range Hb2 to Hb3 in the horizontal direction and the range Vb2 to Vb3 in the vertical direction as illustrated in FIG. 25B.

Subsequently, in step S1507, the CPU 1303 sets, in the VOB(d), the range of columns from which the image A data pertaining to the VOB area is read out, to the image pickup element 1300. The setting is for updating the correction data for the image A data.

In addition to the setting, the VOB(d), VOB(e) and VOB(f) areas of the image A+B signal, and the image A+B area as the open area of the image A+B signal are set for the image A+B.

Next, in step S2402, those settings of the update gain is performed. Owing to resetting of the memory in step S1503, the correction data on the column corresponding to the VOB(d) area is not stored in the memory 301. Accordingly, a gain B value larger than the gain A value is set.

After the setting, in step S1508 the CPU 1303 causes the image pickup element 1300 to start the read-out operation.

As illustrated in FIG. 27, the read-out image signal is an image signal 2740 read out from each area set as described above. That is, the signal includes the VOB(d) area of the image A data, the VOB(d), VOB(e), VOB(f) areas of the image A+B data, the A image area as the open pixel area of the image A data, and the image A+B area as the open area of the image A+B data.

Figure 28D:
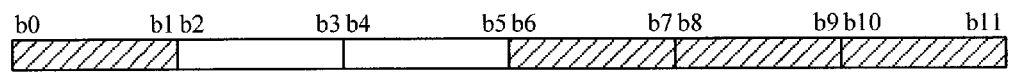
Figure 28E:
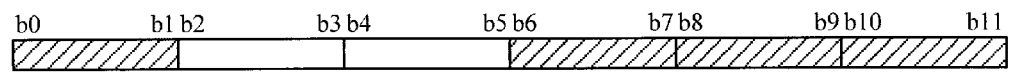
Figure 28F:
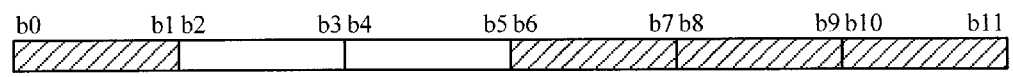

The image signal is converted into a digital signal by the AFE 1302 and subsequently input into the image correction unit 300. In the image correction unit 300, the image A data of the VOB(d) area is input into the correction data update circuit 305, and the correction data is updated based on a predetermined process. As illustrated in FIG. 28D, as to the correction data of the image A data, in a state with no correction data, the correction data is updated and subsequently stored in the addresses b0 to b1. As to the correction data of the image A+B data, the correction data stored in the addresses b6 to b11 is output from the memory 301, the correction data is updated and subsequently stored in the addresses b6 to b11 again.

At this stage, the correction data of the image A data is a data provided during calculation progress for correcting the columns in the range Hb0 to Hb1.

The image data in the A image area as the open pixel area is corrected on the each column basis on the basis of the correction data updated as described above. As described in FIG. 29D, the correction data stored in the addresses b2 to b3 is output from the memory 301, and the image data is corrected on the each column basis. The address b2 corresponds to the column Hb2 in the pixel array 1300a. The address b3 corresponds to the column Hb3. The number of correction data in the addresses b2 to b3 is the same as the number of columns in the range Hb2 to Hb3.

The image data in the image A+B area as the open pixel area is corrected on the each column basis on the basis of the correction data updated as described above. The correction data stored in the addresses b6 to b11 is output from the memory 301, and the image data is corrected on the each column basis. The address b6 corresponds to the column Hb0 in the pixel array 1300a. The address b11 corresponds the column Hb5. The number of correction data in the addresses b6 to b11 is the same as the number of correction data in the range Hb0 to Hb5.

Next, the AF operation is performed in step S1509, and subsequently it is determined whether photographing is continued or not in step S1501.

Subsequently, if the read-out mode is not changed in step S2403, the processing proceeds to step S1511. If the AF area is not changed, the processing proceeds to step S1507.

In and after step S1507, the frame is read out in manners of the images 2750 to 2790 illustrated in FIG. 27.

With the image 2750 in FIG. 27 in step S2402, a gain C having the magnitude such as gain is gain A<gain C<gain B is set. At this time, the correction data stored in the addresses b0 to b1 is of a calculation progress.

With the image 2760 in FIG. 27 in step S2402, the gain A having magnitude smaller than that of the gain C is set. At this time, the correction data stored in the addresses b0 to b1 is calculated as the correction data.

As described above, in the process of continuously reading out the VOB area of the same image A data and sequentially updating the correction data, the update gain is changed from the high value to the low value, thereby allowing the correction data to be quickly generated based on a limited number of data in the VOB area. In this embodiment, three different gains are used. However, the gain is not limited thereto.

Figure 28G:
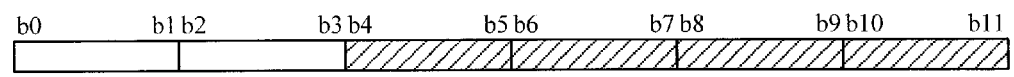
Figure 28H:
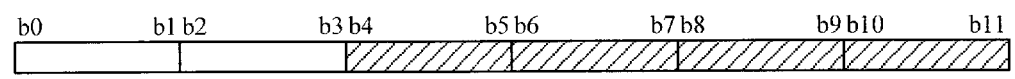
Figure 28I:
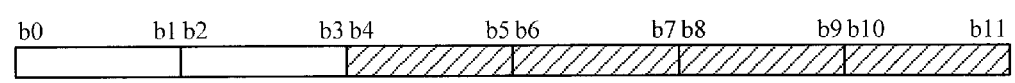
Figure 29A:
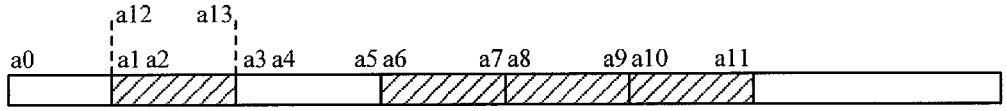
FIGS. 29A, 29B, 29C, 29D, 29E, 29F, 29G, 29H and 29I are diagrams schematically illustrating memory access in reading the correction data by the image correction unit according to the third embodiment of the present invention.
Figure 29B:
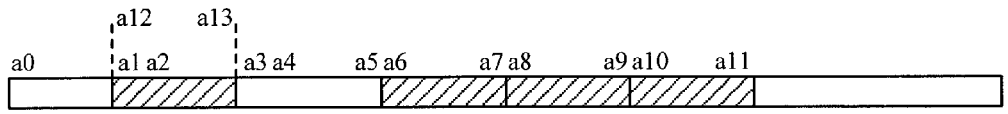
Figure 29C:
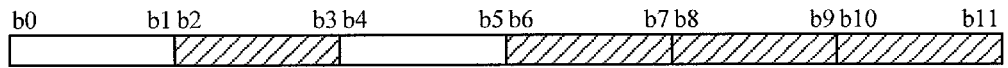
Figure 29D:
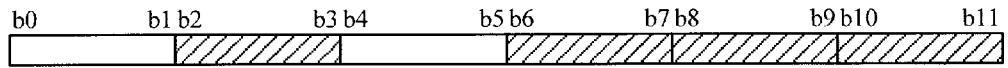
Figure 29E:
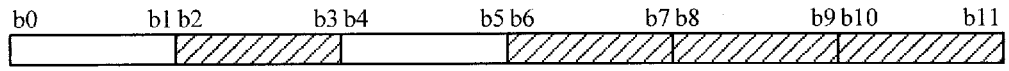
Figure 29F:
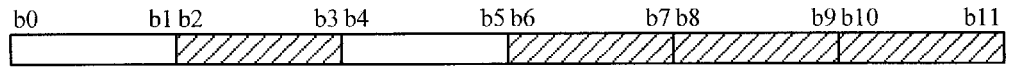
Figure 29G:
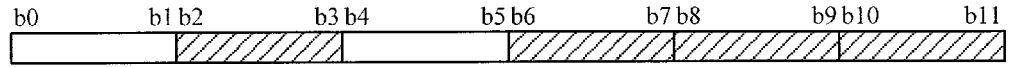
Figure 29H:
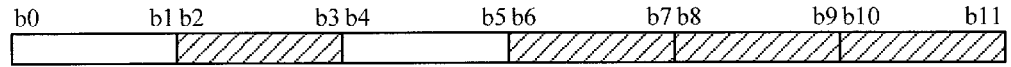
Figure 29I:
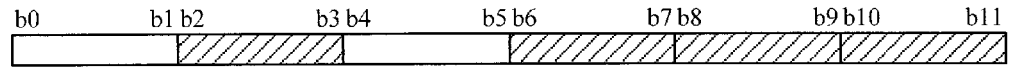

Also on the area VOB(f) where the correction data is not generated, the gain setting and readout analogous to those described above generate and update correction data (images 2770 to 2790 in FIG. 27; FIGS. 28G to 28I).

After the correction data in each area is generated, the gain is set to the gain A, and the operation of sequentially reading out each VOB area on the image A data is performed.

Even in the case where the above operation switches the read-out modes, such as addition and non-addition, to once reset the correction data, the correction data of the image A data in the area used for AF can be generated and the AF operation can be performed from the next frame. At this time, the update gain can be changed from the limited VOB area and the correction data can be generated, which can minimize the number of frames subjected to the cycle operation and minimize elimination of the image frame.

The correction data generation, the update operation and the control of changing the update gain accompanied by change of setting of the read-out mode is not limited to those in the image pickup apparatus including the image pickup element including the pixels for focus detection as with the second and this embodiment. This scheme is also applicable to the operation of the image pickup apparatus in the first embodiment.

Each of units configuring the image pickup apparatus according to the embodiments of the present invention and each step in the control method can be realized by operation of a program stored in a RAM or a ROM of a computer. The program and a computer-readable storing medium stored with the program are included in the present invention.

Furthermore, the present invention can be implemented as embodiments, for instance, a system, an apparatus, a method, a program and a storing medium. More specifically, the present invention is applicable to a system including a plurality of apparatuses and to an apparatus including a piece of equipment.

The present invention also includes a case of directly or remotely supplying a program of software realizing the functions of the embodiments to a system and an apparatus. The present invention also includes a case of being realized by a computer of the system or the apparatus reading out and executing the supplied program codes.

Accordingly, the program codes themselves installed in the computer to realize the functional processes of the present invention in a computer also realize the present invention. That is, the present invention also includes the computer program itself for realizing the functional processes of the present invention. In this case, only with the functions of the program, various modes, such as object codes, a program executed by an interpreter, and a script data supplied to an OS, can be adopted.

The storing medium for supplying the program may be any of a flexible disk, a hard disk, an optical disk and a magneto-optical disk. Furthermore, the medium may be any of MO, CD-ROM, CD-R, CD-RW, a magnetic tape, a nonvolatile memory card, ROM and DVD (DVD-ROM, DVD-R).

Another method of supplying a program may be a method of connection to a website of the Internet using a browser of a client computer. The program can also be supplied by downloading the computer program of the present invention itself, or a file that is compressed and has an automatic installation function, to a storing medium, such as a hard disk, from the website. The method can be realized by dividing the program codes configuring the program of the present invention into a plurality of files and downloading the files from different websites. That is, the present invention also includes a WWW server allowing a plurality of users to download the program files for realizing the functional processes of the present invention on computers.

Another method may encrypt the program of the present invention, store the program in a storing media, such as CD-ROM, distribute the media to users, allows users satisfying predetermined conditions to download key information for decrypting the encryption from a website via the Internet. The method allows the encrypted program to be executed using the key information and to be installed in a computer to be executed.

The computer executes the read-out program, thereby realizing the functions of the embodiments. Furthermore, based on the instruction of the program, the OS operating on the computer executes a part of or the entire actual processes, which can realize the functions of the embodiments.

According to a still another method, a program read out from a storing medium is written in a memory included in a functional extension board inserted in the computer or a functional extension unit connected to the computer. Based on instructions of the program, a CPU included in the functional extension board or the functional extension unit executes a part of or the entire actual processes. The processes also realize the functions of the embodiments.

Any of the embodiments only describe an example for specific implementation. The technical scope of the present invention should not be construed in a limited manner according to the embodiment. That is, the present invention can be implemented in various forms without departing from the technical thought or principal characteristics.

While the present invention is described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-027368, filed on Feb. 10, 2012, which is hereby incorporated by reference herein in its entirety.

What is claimed is:

1. An image pickup apparatus, comprising:
an image pickup element that includes a pixel array of a plurality of pixels arranged in a first direction and a second direction to generate an image signal read out line by line, the pixel array including a first area and a second area, the first area including a plurality of third areas;
a read-out unit that reads out, frame by frame, the image signal from the first area and the second area in the image pickup element, wherein with each frame, the read-out unit reads out the image signal by a line unit, the lines are in the first direction;
a generation unit that generates a correction data for the image signal output from the second area based on the image signal output from the first area; and
a storing unit that includes a memory, and stores the correction data generated by the generation unit,
wherein the read-out unit reads out in a frame, the image signals from a predetermined area among the second area in the second direction, and reads out the image signal from a third area selected for the frame sequentially among the plurality of third areas, wherein the plurality of third areas are arranged in the first area in the second direction, and the image signal from the first area, for generating the correction data, is stored in a memory by sequentially reading out the image signal from the plurality of third areas.

2. The image pickup apparatus according to claim 1, wherein the pixels in a range of the first area in a horizontal direction correspond to a range of the third area sequentially changed on each frame basis.

3. The image pickup apparatus according to claim 1, further comprising:
a setting unit that sets a range of the pixels for reading out the image signal in the direction of arranging lines,
wherein the read-out unit selectively outputs the image signal from the pixels in the first and second areas according to setting by the setting unit.

4. The image pickup apparatus according to claim 3, wherein, when the setting unit changes a horizontal range of set in the second area, the correction data is generated from a memory which stores the pixels in the first area in corresponding to the changed range in the second area.

5. The image pickup apparatus according to claim 3, further comprising a correction unit that corrects the image signal output from the pixels in the second area using the correction data stored in addresses corresponding to a horizontal range set in the second area.

6. The image pickup apparatus according to claim 1, wherein the update unit includes a unit that sets an update gain for the correction data stored in the storing unit, wherein, after the storing unit stores the correction data generated by the generation unit in the memory, the unit that sets the update gain changes a value of the update gain every time when the update unit updates the correction data.

7. The image pickup apparatus according to claim 1, wherein the pixels arranged in the first area are light-shielded pixels, the pixels arranged in the second area are open pixels, and the image signal is generated by photoelectrically converting an optical image of an object.

8. A method of controlling an image pickup apparatus including an image pickup element and a memory, the image pickup element including a pixel array of a plurality of pixels arranged in a first direction and a second direction to generate an image signal read out line by line, and the pixel array including a first area and a second area, the first area including a plurality of third areas, the method comprising:
reading out, frame by frame, the image signal from the first area and the second area in the image pickup element, wherein with each frame, reading out the image signal is performed by a line unit, the lines are in the first direction;
generating a correction data for the image signal read out from the pixels in the second area on the basis of the image signal read out from the pixels in the first area; and
storing the correction data generated by the generating,
wherein in the step of reading out, in a frame, the image signals from a predetermined area among the second area in the second direction, and reading out the image signal from a third area selected for the frame sequentially among the plurality of third areas, wherein the plurality of third areas are arranged in the first area in the second direction, and the image signal from the first area, for generating the correction data, is stored in a memory by sequentially reading out the image signal from the plurality of third areas.

9. A non-transitory computer readable storage medium storing program code for causing a computer to control an image pickup apparatus including an image pickup element and a memory, the element including a pixel array of a plurality of pixels arranged in a first direction and a second direction to generate an image signal read out line by line, and the pixel array including a first area and a second area, the first area including a plurality of third areas, the code comprising:
a program code means for reading out, frame by frame, the image signal from the first area and the second area in the image pickup element, wherein with each frame, the program code means reads out the image signal by a line unit, the lines are in the first direction;
a program code means for generating a correction data for the image signal read out from the pixels in the second area on the basis of the image signal read out from the pixels in the first area; and
a storing unit that includes a memory, and stores the correction data generated by the generation unit,
wherein in the program code means for reading out, reading out, a frame, the image signals from a predetermined area among the second area in the second direction, and reading out the image signal from a third area selected for the frame sequentially among the plurality of third areas, wherein the plurality of third areas are arranged in the first area in the second direction, and the image signal from the first area, for generating the correction data, is stored in a memory by sequentially reading out the image signal from the plurality of third areas.

10. The image pickup apparatus according to claim 1, wherein the read-out unit reads out the image signal per each of the lines.

11. The image pickup apparatus according to claim 1, further comprising a correction unit that reads out the correction data from the memory corresponding to a horizontal range set in the second area, and corrects the image signal read out from the pixels in the range set in the second area, using the read-out correction data.

12. The image pickup apparatus according to claim 11, further comprising an update unit that updates the correction data stored in a predetermined range of addresses in the memory, based on the image signal read out from the pixels in a horizontal range in the first area corresponding to the predetermined range of addresses, the updated range is irrespective of the range set in the second area.

13. The image pickup apparatus according to claim 1, wherein the memory stores signal of the first area, by sequentially reading out the image signal from the plurality of third areas.

14. The image pickup apparatus according to claim 1, wherein the first area is an optical black area.

* * * * *